US010677604B1

United States Patent
Racah et al.

(10) Patent No.: US 10,677,604 B1
(45) Date of Patent: *Jun. 9, 2020

(54) CONTINUOUSLY UPDATABLE COMPUTER-GENERATED ROUTES WITH CONTINUOUSLY CONFIGURABLE VIRTUAL BUS STOPS FOR PASSENGER RIDE-SHARING OF A FLEET OF RIDE-SHARING VEHICLES AND COMPUTER TRANSPORTATION SYSTEMS AND COMPUTER-IMPLEMENTED METHODS FOR USE THEREOF

(71) Applicant: Via Transportation, Inc., New York, NY (US)

(72) Inventors: Yaron Racah, Givataim (IL); Avishay Sheba, Tel Aviv (IL); Oren Shoval, Jerusalem (IL); Daniel Ramot, New York, NY (US); Shmulik Marcovitch, Tel Aviv (IL)

(73) Assignee: VIA Transportation, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/220,698

(22) Filed: Dec. 14, 2018

Related U.S. Application Data

(63) Continuation of application No. 15/635,744, filed on Jun. 28, 2017, now Pat. No. 10,197,411, which is a
(Continued)

(51) Int. Cl.
*G01C 21/26* (2006.01)
*G01C 21/34* (2006.01)
(Continued)

(52) U.S. Cl.
CPC ......... *G01C 21/3438* (2013.01); *G01C 21/28* (2013.01); *G01C 21/343* (2013.01);
(Continued)

(58) Field of Classification Search
CPC .............................. G08G 1/202; G08G 1/207
(Continued)

(56) References Cited

U.S. PATENT DOCUMENTS 4,212,069 A 7/1980 Baumann
6,697,730 B2 * 2/2004 Dickerson .............. G06Q 50/30
701/465

(Continued)

FOREIGN PATENT DOCUMENTS

CN 103327440 9/2013
CN 104751625 7/2015
(Continued)

OTHER PUBLICATIONS

Intelligent Carpool Routing for Urban Ridesharing by Mining GPS Trajectories;Wen He; Kai Hwang; Deyi Li ;IEEE Transactions on Intelligent Transportation Systems; Year: 2014, vol. 15, Issue: 5; pp. 2286-2296, DOI: 10.1109/TITS.2014.2315521.
(Continued)

*Primary Examiner* — Cuong H Nguyen
(74) *Attorney, Agent, or Firm* — Finnegan, Henderson, Farabow, Garrett & Dunner, LLP

(57) ABSTRACT

In some embodiments, the present invention provides a computer-implemented transportation system which can include at least the following components: a specialized computer machine, including: a non-transient memory, electronically storing particular computer executable program code; a specifically programmed computer processor of the specialized computer machine of the computer-implemented transportation system that is configured to perform at least
(Continued)

the following operations: electronically receiving, in real-time, via a computer network, a plurality of electronic riding requests from a plurality of electronic computing devices operated by a plurality of ride-sharing requesting passengers; where each electronic riding request from each ride-sharing requesting passenger includes: a passenger-requested origin point, and a passenger-requested destination point; for a particular electronic riding request, dynamically determining, in real-time, from a plurality of candidate vehicles an assigned vehicle for picking up the particular ride-sharing requesting passenger and a pair of assigned virtual pickup and dropoff bus stop tasks.

19 Claims, 7 Drawing Sheets

Related U.S. Application Data continuation of application No. 15/410,324, filed on Jan. 19, 2017, now Pat. No. 9,816,824, which is a continuation of application No. 15/215,349, filed on Jul. 20, 2016, now Pat. No. 9,562,785.

(60) Provisional application No. 62/194,651, filed on Jul. 20, 2015.

(51) Int. Cl.
| | |
|---|---|
| *G06Q 50/30* | (2012.01) |
| *G01S 19/39* | (2010.01) |
| *G08G 1/00* | (2006.01) |
| *G01C 21/28* | (2006.01) |
| *G06Q 10/06* | (2012.01) |
| *G01C 21/36* | (2006.01) |
| *G08G 1/01* | (2006.01) |

(52) U.S. Cl.
CPC ..... *G01C 21/3415* (2013.01); *G01C 21/3423* (2013.01); *G01C 21/3676* (2013.01); *G01S 19/39* (2013.01); *G06Q 10/06315* (2013.01); *G06Q 50/30* (2013.01); *G08G 1/202* (2013.01); *G01C 21/34* (2013.01); *G01C 21/36* (2013.01); *G08G 1/0125* (2013.01); *G08G 1/0137* (2013.01)

(58) Field of Classification Search
USPC .......... 701/400–410, 412; 340/991–994
See application file for complete search history.

(56) References Cited

U.S. PATENT DOCUMENTS

| | | | |
|---|---|---|---|
| 7,136,747 B2 | 11/2006 | Raney | |
| 8,688,532 B2 | 4/2014 | Khunger et al. | |
| 8,868,529 B2 | 10/2014 | Lerenc | |
| 8,965,683 B2 | 2/2015 | Nomura | |
| 9,068,851 B2 | 6/2015 | Lerenc | |
| 9,074,904 B1 | 7/2015 | Huang et al. | |
| 9,094,824 B2 | 7/2015 | Jayanthi | |
| 9,304,009 B2 | 4/2016 | Beaurepaire et al. | |
| 9,322,661 B2 | 4/2016 | Wechsler | |
| D763,294 S | 8/2016 | Amin et al. | |
| 9,562,785 B1 | 2/2017 | Racah et al. | |
| 9,599,481 B2* | 3/2017 | Lord | G01C 21/34 |
| 9,816,824 B1 | 11/2017 | Racah et al. | |
| 9,959,512 B2* | 5/2018 | Camp | G06Q 10/02 |
| 10,197,411 B2* | 2/2019 | Racah | G01C 21/3438 |
| 2001/0037174 A1* | 11/2001 | Dickerson | G08G 1/202 |
| | | | 701/400 |
| 2011/0301985 A1* | 12/2011 | Camp | G06Q 10/02 |
| | | | 705/5 |
| 2011/0307282 A1* | 12/2011 | Camp | G06Q 10/02 |
| | | | 705/7.11 |
| 2011/0313804 A1* | 12/2011 | Camp | G06Q 10/02 |
| | | | 705/7.13 |
| 2012/0323642 A1* | 12/2012 | Camp | G06Q 10/02 |
| | | | 705/13 |
| 2013/0041941 A1 | 2/2013 | Tomasic et al. | |
| 2013/0110385 A1 | 5/2013 | Heed et al. | |
| 2014/0195146 A1 | 7/2014 | Grigsby et al. | |
| 2015/0032366 A1 | 1/2015 | Man et al. | |
| 2015/0091507 A1* | 4/2015 | Hyde | B60L 11/1824 |
| | | | 320/108 |
| 2015/0100238 A1 | 4/2015 | Cai et al. | |
| 2015/0204684 A1 | 7/2015 | Rostamian et al. | |
| 2015/0219464 A1 | 8/2015 | Beaurepaire et al. | |
| 2015/0248689 A1* | 9/2015 | Paul | G06Q 30/0222 |
| | | | 705/14.23 |
| 2015/0324708 A1* | 11/2015 | Skipp | G08G 1/127 |
| | | | 705/5 |
| 2016/0027307 A1 | 1/2016 | Abhyanker et al. | |
| 2017/0074669 A1 | 3/2017 | Newlin et al. | |
| 2017/0169366 A1 | 6/2017 | Klein et al. | |

FOREIGN PATENT DOCUMENTS

| | | |
|---|---|---|
| EP | 2605149 | 6/2013 |
| SG | 2012065264 | 4/2014 |

OTHER PUBLICATIONS

Real-time carpooling and ride-sharing: Position paper on design concepts, distribution and cloud computing strategies; Dejan Dimitrijevic; Nemanja Nedic; Vladimir Dimitrieski; Computer Science and Information Systems (FedCSIS), 2013 Federated Conference on; Year: 2013; pp. 781-786; Referenced in: IEEE Conference Publications.
RideBuddies—Multi agent system for ride sharing/carpooling; Harini Sirisena; Advances in ICT for Emerging Regions (ICTer), 2014 International Conference on; Year: 2014; pp. 252-252, DOI: 10.1109/ICTER.2014.7083910; Referenced in: IEEE Conference Publications.
Smart ride share with flexible route matching; Chung-Min Chen; David Shallcross; Yung-Chien Shih; Yen-Ching Wu; Sheng-Po Kuo; Yuan-Ying Hsi; Yuhsiang Holderby; William Chou; Advanced Communication Technology (ICACT), 2011 13th International Conference on; Year: 2011; pp. 1506-1510.
When Transportation Meets Communication: V2P over VANETs; Nianbo Liu; Ming Liu; Jiannong Cao; Guihai Chen; Wei Lou; Distributed Computing Systems (ICDCS), 2010 IEEE 30th International Conference on; Year: 2010; pp. 567-576, DOI: 10.1109/ICDCS.2010.83.
A Dynamic Pricing Method for Carpooling Service Based on Coalition al Game Analysis; Li et al.; 2016 IEEE 18th Inter Conf. on High Performance Computing and Comm.; IEEE 14th Inter. Conf. on Smart City; IEEE 2nd Inter Conf. on Data Science and Systems (HPCC/SmartCity/DSS) Year: 2016; pp. 78-85, DOI: 10.1109/HPCC-SmartCity-DSS.2016.0022.
Green Cabs vs. Uber in New York City; Lasse Korsholm Poulsen; Daan Dekkers; Nicolaas Wagenaar; Wesley Snijders; Ben Lewinsky; Raghava Rao Mukkamala; Ravi Vatrapu; 2016 IEEE International Congress on Big Data (BigData Congress); year 2016; pp. 222-229; DOI: 10.1109/BigDataCongress.2016.35.
B-Planner: Planning Bidirectional Night Bus Routes Using Large-Scale Taxi GPS Traces; Chao Chen et al.; IEEE Transactions on Intelligent Transportation Systems; year: 2014, vol. 15, Issue: 4; pp. 1451-1465.
Real-Time City-Scale Taxi Ridesharing; Shuo Ma et al., IEEE Transactions on Knowledge and Data Engineering; year 2015, vol. 27, issue 7; pp. 1782-1795, from IEEE Journals & Magazines.
Based-Agent Distributed Architecture to Manage the Dynamic Multi-hop Ridesharing System; Sondes Ben Cheikh; Slim Hammadi; Christian Tahon; 2014 IEEE 13th International Symposium on Network Computing and Applications; year 2014; pp. 101-104.

(56) References Cited

OTHER PUBLICATIONS

Recommend a profitable cruising route for taxi drivers; Hao Dong et al., 17$^{th}$ International IEEE Conf on Intelligent Transportation Systems (ITSC); year 2014; pp. 203-208.

An optimization-based approach for passenger to shared taxi allocation; Hadi El Hosni et al.; SoftCOM; year 2012, 20$^{th}$ Inter Conf. on Software, Telecom and Computer Network.

Smart ride share with flexible route matching; Chung-Min Chen et al., year 2011; 13$^{th}$ Inter Conf. on Advanced Comm Technology (ICACT2011), pp. 1506-1510.

DBH-CLUS: A Hierarchal Clustering Method to Identify Pick-up/Drop-off Hotspots; XueJin Wan et al., year 2015, 15$^{th}$ IEEE/ACM Inter Symp on Cluster, Cloud and Grid Computing; year 2015, pp. 890-897.

Stephanie Francis Ward, 'App' me a ride, Jan. 2014, p. 13, ABA Journal.

Lisa Rayle et al., App-based, on-demand ride services: Comparing Taxi and Ridesourcing Trips and User Characteristics in San Francisco, Nov. 2014, University of California Transportation Center (UCTC), pp. 1-20.

Matthew Feeney, Is ridesharing safe?; Policy Analysis—CATO Institute, Jan. 27, 2015, pp. 1-16.

\* cited by examiner

CONTINUOUSLY UPDATABLE COMPUTER-GENERATED ROUTES WITH CONTINUOUSLY CONFIGURABLE VIRTUAL BUS STOPS FOR PASSENGER RIDE-SHARING OF A FLEET OF RIDE-SHARING VEHICLES AND COMPUTER TRANSPORTATION SYSTEMS AND COMPUTER-IMPLEMENTED METHODS FOR USE THEREOF

RELATED APPLICATIONS

This application is a continuation of U.S. application Ser. No. 15/635,744, filed Jun. 28, 2017, which is a continuation of U.S. application Ser. No. 15/410,324, filed Jan. 19, 2017 (now U.S. Pat. No. 9,816,824), which is a continuation of U.S. application Ser. No. 15/215,349, filed Jul. 20, 2016 (now U.S. Pat. No. 9,562,785), which claims the benefit of U.S. Provisional Application No. 62/194,651, filed Jul. 20, 2015. All of the foregoing are incorporated herein by reference in their entirety.

FIELD OF INVENTION

In some embodiments, the present invention is related to continuously updatable computer-generated routes with continuously configurable virtual bus stops for passenger ride-sharing of a fleet of ride-sharing vehicles and computer transportation systems and computer-implemented methods for use thereof.

BACKGROUND OF THE INVENTION

Typically, ride-sharing allows people to share rides to their destinations.

SUMMARY OF THE INVENTION

In some embodiments, the present invention provides for a computer-implemented method that includes at least the following steps: electronically receiving, in real-time, by at least one specifically programmed computer processor, via at least one computer network, a plurality of electronic riding requests from a plurality of electronic computing devices operated by a plurality of ride-sharing requesting passengers; where each electronic riding request from each ride-sharing requesting passenger includes: an origin location data identifying a passenger-requested origin point, and a destination location data identifying a passenger-requested destination point; for a particular electronic riding request of a particular ride-sharing requesting passenger: electronically accessing, in real-time, by the at least one specifically programmed computer processor, for at least one database, at least one grid of virtual bus stops for at least one geographic locale; where each virtual bus stop corresponds to a geographic location point within the at least one geographic locale at which a particular ride-sharing requesting passenger can be picked up or drop off by a first assigned vehicle; dynamically selecting, in real-time, by the at least one specifically programmed computer processor, from at least one grid of virtual bus stops for the at least one geographic locale, a subset of candidate virtual pickup bus stops and a subset of candidate virtual dropoff bus stops based, at least in part, on: i) a first absolute walking distance, being a distance from the passenger-requested origin point to at least one candidate virtual pickup bus stop of the subset of candidate virtual pickup bus stops, and ii) a second absolute walking distance, being a distance from at least one candidate virtual dropoff bus stop of the subset of candidate virtual dropoff bus stops to the passenger-requested destination point; electronically receiving, in real-time, during a first time period, by the at least one specifically programmed computer processor, via the at least one computer network, current vehicle location data for a plurality of ride-sharing vehicles traveling within the at least one geographic locale, where the current vehicle location data include global positioning system (GPS) data generated by at least one GPS component of at least one electronic computing device associated with each ride-sharing vehicle; electronically accessing, in real-time, by the at least one specifically programmed computer processor, current ride-sharing data which are representative of current routes and current virtual bus stops associated with a plurality of riding passengers who are currently riding in the plurality of ride-sharing vehicles; where the plurality of riding passengers includes at least one hundred riding passengers; dynamically determining, in real-time, by the at least one specifically programmed computer processor, a plurality of candidate vehicles which can pick up the particular ride-sharing requesting passenger, where the determining of the plurality of candidate vehicles is based, at least in part on: the subset of candidate virtual pickup bus stops, the subset of candidate virtual dropoff bus stops, the current ride-sharing data and the current vehicle location data; dynamically determining, in real-time, from the plurality of candidate vehicles, by the at least one specifically programmed computer processor, 1) a first assigned vehicle for picking up the particular ride-sharing requesting passenger and 2) a pair of assigned virtual pickup and dropoff bus stop tasks related to the particular ride-sharing requesting passenger, based, at least in part, on: i) maximizing a vehicle occupancy to be at least two ride-sharing passengers in the first assigned vehicle at least a portion of a ride of the particular ride-sharing requesting passenger, ii) minimizing at least one of: 1) a first duration of time which each ride-sharing passenger spends in each candidate ride-sharing vehicle; 2) a second duration of time which each ride-sharing passenger spends waiting for each candidate ride-sharing vehicle to arrive at a respective virtual bus stop; 3) a third duration of time which each ride-sharing passenger spends walking from the passenger-requested origin point to a respective candidate virtual pickup bus stop and from a respective candidate virtual dropoff bus stop to the passenger-requested destination point; 4) a fourth duration of time which each candidate ride-sharing vehicle is held up in a traffic until a respective final virtual dropoff bus stop associated with the last ride-sharing passenger during a particular time period; iii) an order in which a pair of candidate virtual pickup and dropoff bus stop tasks are inserted into a route schedule of existing pickup and dropoff virtual bus stop tasks associated with each candidate vehicle of the plurality of candidate vehicles; dynamically generating, in real-time, by the at least one specifically programmed computer processor, a route proposal for the first assigned vehicle, where the route proposal for the first assigned vehicle includes a first updated route schedule, formed by inserting the pair of assigned virtual pickup and dropoff bus stop tasks of the particular ride-sharing requesting passenger into an existing route schedule, including existing pickup and dropoff virtual bus stop tasks associated with the first assigned vehicle; causing to electronically display, in real-time, via the at least one computer network, by the at least one specifically programmed computer processor, the assigned virtual pickup bus stop on a screen of a first electronic computing device associated with the particular ride-sharing requesting passenger; and causing to electronically display, in real-time, via the at least one computer network, by the at least one specifically programmed computer processor, the first updated route schedule on a screen of a second electronic computing device associated with the first assigned vehicle.

In some embodiments, the selecting of each candidate virtual pickup bus stop into the subset of candidate virtual pickup bus stops is based, at least in part, on at least one of: i) a first walking distance, being a distance from the passenger-requested origin point to each candidate virtual pickup bus stop, ii) a second walking distance, being a distance from each candidate virtual dropoff bus stop to the passenger-requested destination point, iii) at least one first walking comfort condition associated with the first walking distance, the second walking distance, or both, iv) at least one first walking safety condition associated with a first walking route, being a route from the passenger-requested origin point to each candidate virtual pickup bus stop, v) at least one passenger well-being related factor, vi) at least one passenger personal preference related to at least one of: a walking distance, an expected time of arrival, a ride duration, a price, and any combination thereof, vii) at least one environment related factor, viii) a first cost assigned to each pair of a particular candidate virtual pickup bus stop and a particular candidate virtual dropoff bus stop, and ix) any combination thereof; and where the selecting of each candidate virtual dropoff bus stop into the subset of candidate virtual dropoff bus stops is based, at least in part, on at least one of: i) the first walking distance, the second walking distance, or both, ii) the sum of the first walking distance and the second walking distance, iii) the at least one walking comfort condition, iv) at least one second walking safety condition associated with a second walking route, being a route from each candidate virtual dropoff bus stop to the passenger-requested destination point, v) the at least one passenger well-being related factor, vi) the at least one passenger personal preference, vii) the at least one environment related factor, viii) the first cost assigned to each pair of the particular candidate virtual pickup bus stop and the particular candidate virtual dropoff bus stop, and ix) any combination thereof.

In some embodiments, the cost assigned to each pair of the particular candidate virtual pickup bus stop and the particular candidate virtual dropoff bus stop is based, at least in part on at least one cost related to at least one ride segment passing through an area associated with a particular demand.

In some embodiments, the first absolute walking distance is a first reasonable walking distance; where the second absolute walking distance is a second reasonable walking distance; and where the method further includes: dynamically determining, by the at least one specifically programmed computer processor, the first reasonable walking distance based, at least in part, on at least one of: i) the distance from the passenger-requested origin point to the at least one candidate virtual pickup bus stop, ii) a direction of travel of a road on which the at least one candidate virtual pickup bus stop is located, iii) an availability of at least one first additional candidate virtual pickup bus stop having a shorter walking distance, and iv) an availability of at least one second additional candidate virtual pickup bus stop having a longer walking distance; and dynamically determining, by the at least one specifically programmed computer processor, the second reasonable walking distance based, at least in part, on at least one of: i) the distance from at least one candidate virtual dropoff bus stop of the subset of candidate virtual dropoff bus stops to the passenger-requested destination point, ii) a direction of travel of a road on which the at least one candidate virtual dropoff stop is located, iii) an availability of at least one first additional candidate virtual dropoff bus stop having a shorter walking distance, and iv) an availability of at least one second additional candidate virtual dropoff bus stop having a longer walking distance.

In some embodiments, the dynamically generating the route proposal for the first assigned vehicle is based, at least in part, on one of: i) at least one existing pickup virtual bus stop task and at least one existing dropoff virtual bus stop task associated with the first assigned vehicle, ii) a road speed of at least one road on which the first assigned vehicle travels or will travel, iii) a distance of at least one route which the first assigned vehicle will travel, and iv) a particular demand associated with the at least one route which the first assigned vehicle will travel.

In some embodiments, the method can further include steps(s) of: continuously tracking, in real-time, by the at least one specifically programmed computer processor, the current vehicle location and the current ride-sharing data to identify at least one condition which requires to re-assign the pair of assigned virtual pickup and dropoff bus stop tasks related to the particular ride-sharing requesting passenger to a second assigned vehicle; dynamically reassigning, by the at least one specifically programmed computer processor, the assigned virtual pickup bus stop task from the first assigned vehicle to the second assigned vehicle; dynamically revising, by the at least one specifically programmed computer processor, the first updated route schedule of the first assigned vehicle to obtain a first revised updated route schedule, by removing the pair of assigned virtual pickup and dropoff bus stop tasks related to the particular ride-sharing requesting passenger, dynamically revising, by the at least one specifically programmed computer processor, a second updated route schedule of the second assigned vehicle to add a second pair of assigned virtual pickup and dropoff bus stop tasks related to the particular ride-sharing requesting passenger, causing to electronically display, in real-time, via the at least one computer network, by the at least one specifically programmed computer processor, the first revised updated route schedule on the screen of the electronic computing device associated with the first assigned vehicle; and causing to electronically display, in real-time, via the at least one computer network, by the at least one specifically programmed computer processor, the second updated route schedule on a screen of an electronic computing device associated with the second assigned vehicle.

In some embodiments, the method can further include step(s) of: generating, by the at least one specifically programmed computer processor, the at least one grid of virtual bus stops for at least one geographic locale; where each virtual bus stop corresponds to a geographic location point within the at least one geographic locale at which at least one passenger can be picked up or drop off by at least one vehicle; electronically receiving, by the at least one specifically programmed computer processor, via the at least one computer network, human-readable location identifying data for uniquely identify each geographic location point corresponding to each virtual bus stop in the grid of virtual bus stops; electronically associating, by the at least one specifically programmed computer processor, the human-readable location identifying data to each geographic location point corresponding to each virtual bus stop in the grid of virtual bus stops; and electronically storing, by the at least one specifically programmed computer processor, the grid of virtual bus stops with the human-readable location identifying data in the at least one database.

In some embodiments, the geographic location point is along at least one main road of the at least one geographic locale.

In some embodiments, the method can further include steps(s) of: generating, by the at least one specifically programmed computer processor, demand-point tasks based, at least in part, on one of: current ride-sharing demand data within the at least one geographic locale, and historic ride-sharing demand data within the at least one geographic locale; dynamically assigning, by the at least one specifically programmed computer processor, at least one demand-point task assigned to the first assigned vehicle; and where the dynamically determining the first assigned vehicle and the pair of assigned virtual pickup and dropoff bus stop tasks related to the particular ride-sharing requesting passenger is further based, at least in part, on the at least one demand-point task.

In some embodiments, the current demand data includes data regarding at least one of: i) a first current ride-sharing demand in a vicinity of the passenger-requested origin point, and ii) a second current ride-sharing demand in a vicinity of the passenger-requested destination point.

In some embodiments, each respective reasonable walking distance is in the range of 100-300 meters.

In some embodiments, the dynamically determining the first assigned vehicle and the pair of assigned virtual pickup and dropoff bus stop tasks related to the particular ride-sharing requesting passenger is further based, at least in part, on minimizing an additional walking distance, and where the additional walking distance is in the range of 0-200 meters.

In some embodiments, each respective absolute walking distance is in the range of 200-500 meters. In some embodiments, the dynamically determining the first assigned vehicle and the pair of assigned virtual pickup and dropoff bus stop tasks related to the particular ride-sharing requesting passenger is further based, at least in part, on avoiding exceeding at least one of: i) a fifth duration of time by which a ride duration of each ride-sharing passenger in each candidate ride-sharing vehicle is increased due to the addition of the ride-sharing requesting passenger in the existing route schedule of such candidate ride-sharing vehicle, ii) a detour distance by which a ride distance for each ride-sharing passenger in each candidate ride-sharing vehicle is increased due to the addition of the ride-sharing requesting passenger in the existing route schedule of such candidate ride-sharing vehicle. In some embodiments, the fifth duration of time is in the range of 0.5-15 minutes, and where the detour distance is in the range of 100-1000 meters.

In some embodiments, the present invention provides a computer-implemented transportation system which can include at least the following components: at least one specialized computer machine, including: a non-transient memory, electronically storing particular computer executable program code; and at least one computer processor which, when executing the particular program code, becomes at least one specifically programmed computer processor of the at least one specialized computer machine of the computer-implemented transportation system that is configured to perform at least the following operations: electronically receiving, in real-time, by at least one specifically programmed computer processor, via at least one computer network, a plurality of electronic riding requests from a plurality of electronic computing devices operated by a plurality of ride-sharing requesting passengers; where each electronic riding request from each ride-sharing requesting passenger includes: an origin location data identifying a passenger-requested origin point, and a destination location data identifying a passenger-requested destination point; for a particular electronic riding request of a particular ride-sharing requesting passenger: electronically accessing, in real-time, by the at least one specifically programmed computer processor, for at least one database, at least one grid of virtual bus stops for at least one geographic locale; where each virtual bus stop corresponds to a geographic location point within the at least one geographic locale at which a particular ride-sharing requesting passenger can be picked up or drop off by a first assigned vehicle; dynamically selecting, in real-time, by the at least one specifically programmed computer processor, from at least one grid of virtual bus stops for the at least one geographic locale, a subset of candidate virtual pickup bus stops and a subset of candidate virtual dropoff bus stops based, at least in part, on: i) a first absolute walking distance, being a distance from the passenger-requested origin point to at least one candidate virtual pickup bus stop of the subset of candidate virtual pickup bus stops, and ii) a second absolute walking distance, being a distance from at least one candidate virtual dropoff bus stop of the subset of candidate virtual dropoff bus stops to the passenger-requested destination point; electronically receiving, in real-time, during a first time period, by the at least one specifically programmed computer processor, via the at least one computer network, current vehicle location data for a plurality of ride-sharing vehicles traveling within the at least one geographic locale, where the current vehicle location data include global positioning system (GPS) data generated by at least one GPS component of at least one electronic computing device associated with each ride-sharing vehicle; electronically accessing, in real-time, by the at least one specifically programmed computer processor, current ride-sharing data which are representative of current routes and current virtual bus stops associated with a plurality of riding passengers who are currently riding in the plurality of ride-sharing vehicles; where the plurality of riding passengers includes at least one hundred riding passengers; dynamically determining, in real-time, by the at least one specifically programmed computer processor, a plurality of candidate vehicles which can pick up the particular ride-sharing requesting passenger, where the determining of the plurality of candidate vehicles is based, at least in part on: the subset of candidate virtual pickup bus stops, the subset of candidate virtual dropoff bus stops, the current ride-sharing data and the current vehicle location data; dynamically determining, in real-time, from the plurality of candidate vehicles, by the at least one specifically programmed computer processor, 1) a first assigned vehicle for picking up the particular ride-sharing requesting passenger and 2) a pair of assigned virtual pickup and dropoff bus stop tasks related to the particular ride-sharing requesting passenger, based, at least in part, on: i) maximizing a vehicle occupancy to be at least two ride-sharing passengers in the first assigned vehicle at least a portion of a ride of the particular ride-sharing requesting passenger, ii) minimizing at least one of: 1) a first duration of time which each ride-sharing passenger spends in each candidate ride-sharing vehicle; 2) a second duration of time which each ride-sharing passenger spends waiting for each candidate ride-sharing vehicle to arrive at a respective virtual bus stop; 3) a third duration of time which each ride-sharing passenger spends walking from the passenger-requested origin point to a respective candidate virtual pickup bus stop and from a respective candidate virtual dropoff bus stop to the passenger-requested destination point; 4) a fourth duration of time which each candidate ride-sharing vehicle is held up in a traffic until a respective final virtual dropoff bus stop associated with the last ride-sharing passenger during a particular time period; iii) an order in which a pair of candidate virtual pickup and dropoff bus stop tasks are inserted into a route schedule of existing pickup and dropoff virtual bus stop tasks associated with each candidate vehicle of the plurality of candidate vehicles; dynamically generating, in real-time, by the at least one specifically programmed computer processor, a route proposal for the first assigned vehicle, where the route proposal for the first assigned vehicle includes a first updated route schedule, formed by inserting the pair of assigned virtual pickup and dropoff bus stop tasks of the particular ride-sharing requesting passenger into an existing route schedule, including existing pickup and dropoff virtual bus stop tasks associated with the first assigned vehicle; causing to electronically display, in real-time, via the at least one computer network, by the at least one specifically programmed computer processor, the assigned virtual pickup bus stop on a screen of a first electronic computing device associated with the particular ride-sharing requesting passenger; and causing to electronically display, in real-time, via the at least one computer network, by the at least one specifically programmed computer processor, the first updated route schedule on a screen of a second electronic computing device associated with the first assigned vehicle.

BRIEF DESCRIPTION OF THE DRAWINGS

The present invention can be further explained with reference to the attached drawings, wherein like structures are referred to by like numerals throughout the several views. The drawings shown are not necessarily to scale, with emphasis instead generally being placed upon illustrating the principles of the present invention. Therefore, specific structural and functional details disclosed herein are not to be interpreted as limiting, but merely as a representative basis for teaching one skilled in the art to variously employ the present invention.

DETAILED DESCRIPTION OF THE INVENTION

Figure 1:
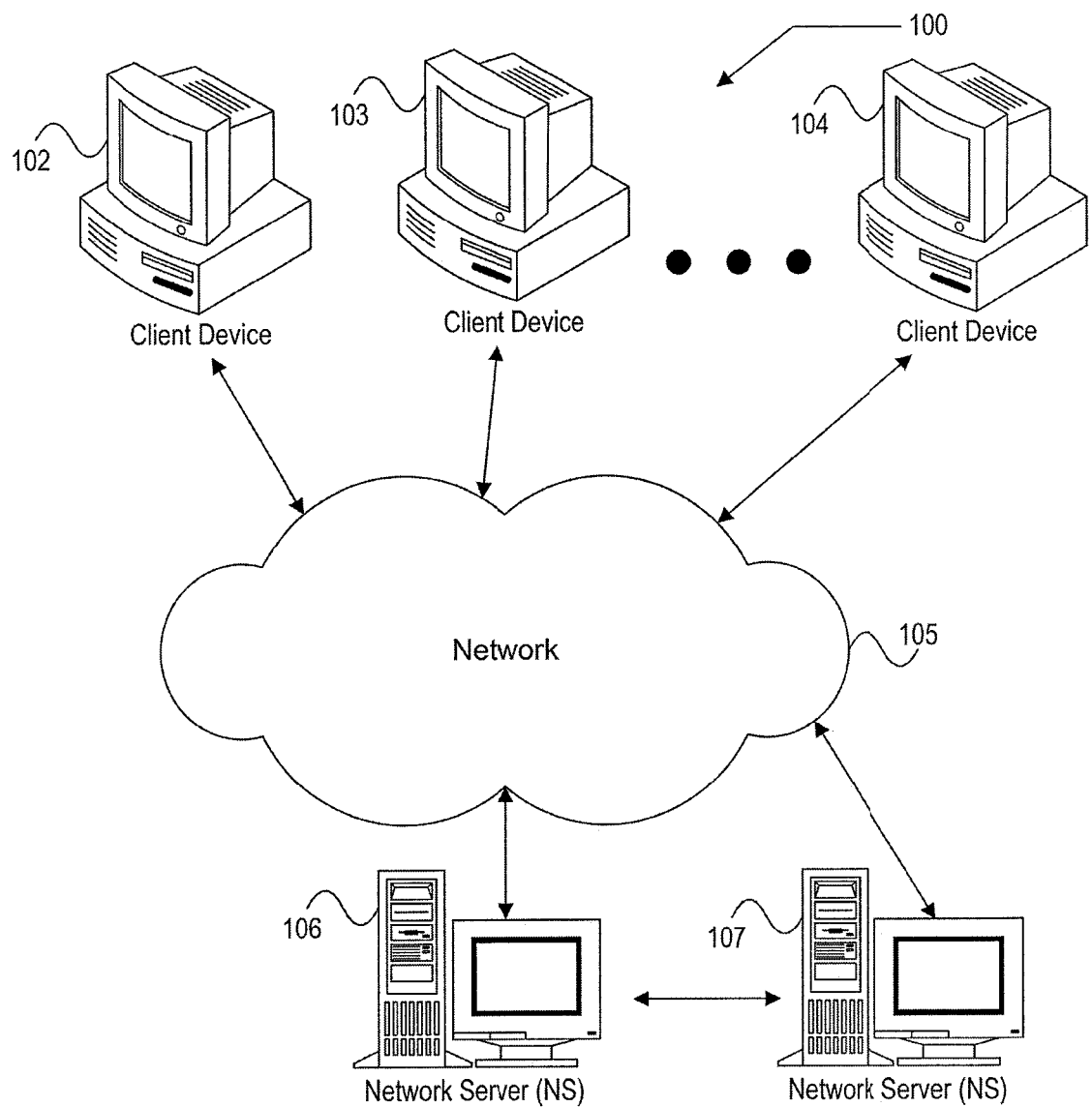
FIGS. 1-4 illustrate certain exemplary computer architecture in accordance with some principles of some embodiments of the present invention.

Among those benefits and innovations that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on".

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. In some embodiments, the terms "instantaneous," "instantaneously," "instantly," and "in real time" refer to a condition where a time difference between a first time when a search request is transmitted and a second time when a response to the request is received is no more than 20 seconds. In some embodiments, the time difference between the request and the response is between less than 1 second and tens of seconds.

As used herein, the term "dynamic(ly)" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, the exemplary computer transportation system(s) of the present invention can include the use of electronic mobile devices (e.g., smartphones, etc.) of passengers and server(s) in the distributed network environment, communicating over a suitable data communication network (e.g., the Internet, etc.) and utilizing at least one suitable data communication protocol (e.g., IPX/SPX, X.25, AX.25, AppleTalk, TCP/IP (e.g., HTTP), etc.). In some embodiments, a plurality of passengers can be, but is not limited to, at least 100 passengers (e.g., but not limited to, 100-999 passengers), at least 1,000 passengers (e.g., but not limited to, 1,000-9,999 passengers), at least 10,000 passengers (e.g., but not limited to, 10,000-99,999 passengers), at least 100,000 passengers (e.g., but not limited to, 100,000-999,999 passengers), at least 1,000,000 passengers (e.g., but not limited to, 1,000,000-9,999,999 passengers), at least 10,000,000 passengers (e.g., but not limited to, 10,000,000-99,999,999 passengers), at least 100,000,000 passengers (e.g., but not limited to, 100,000,000-999,999,999 passengers), at least 1,000,000,000 passengers (e.g., but not limited to, 1,000,000,000-10,000,000,000 passengers).

In some embodiments, the present invention includes computer transportation systems configured to use of a grid of so-called "virtual bus-stops". As used herein, the term "virtual bus stop" is a location selected by the exemplary computer transportation system(s) of the present invention, as being safe for at least one passenger pickup (i.e., the location to which passenger(s) being directed to go to be picked up by a designated vehicle (e.g., bus, van, car, etc.)) and/or at least one passenger dropoff. In some embodiments, the exemplary computer transportation system(s) of the present invention are configured to communicate with at least one driver and at least one passenger, where the communication can be delivered to the at least one driver by use of at least one first graphical user interface (GUI) displayed by a computing device of the driver (e.g., smartphone), and/or where the communication can be delivered to the at least one passenger by use of at least one second GUI at a computing device of the passenger (e.g., smartphone). In some embodiments, the exemplary computer transportation systems of the present invention are configured to determine in which virtual bus-stops should passengers board and/or disembark, and thus, not requiring passengers to board and/or disembark at locations predetermined by a typical bus schedule (e.g., a schedule of M7 bus operated in Manhattan, N.Y.).

In some embodiments, the exemplary computer transportation systems of the present invention are further configured to determine which of the virtual bus-stops among the grid of virtual bus-stops are candidate for boarding and/or disembarking based on at least one of walking distance required with respect to specified origin and/or destination of the request, and/or the sum of the pickup and drop-off walking distances, and/or route considerations such as uncomfortableness when climbing/getting down stairs, crossing bridges/tunnels or any other route segments which may be regarded as less comfortable for walking, and/or specific origin and destination locations that may impose limitations on maximal walking distances such as isolated neighborhoods, and/or passengers' related factors such as, but not limited to, disability, age dependence, and/or personal or global preferences such as, but not limited to, walking distance, expected time of arrival, ride duration, price, and their dependence on factors such as weather and or precipitation, any combination thereof.

In some embodiments, the exemplary computer transportation systems of the present invention are further configured to choose a single boarding virtual bus-stop and/or single disembarking virtual bus-stop (where the later may not be presented to passenger as it is not essential for rider-driver coordination, thus leaving more flexibility to change disembarking virtual bus-stops at a later stage during ride), where the chosen boarding virtual bus-stop and/or disembarking bus-stop are based on at least one of:

costs assigned to boarding-disembarking virtual bus-stop pairs, their insertion order along already assigned boarding and disembarking virtual bus-stops tasks (due to existing passengers in vehicle or passengers that were already assigned to vehicle), and any combination thereof.

In some embodiments, costs may include one or more of:

duration each passenger spends in the vehicle, duration each passenger spends waiting for assigned vehicle to arrive at the designated virtual bus stop, duration each passenger spends walking from origin to pick-up and from drop-off to destination, duration in which vehicle is held up (e.g., until final drop-off), costs related to ride segments in low-demand areas (e.g. highways), and any combination thereof.

In some embodiments, the present invention includes computer transportation systems configured to identify a passenger-requested ride, where the exemplary computer transportation systems are configured to assign the ride to an available vehicle. In some embodiments, assigning a ride to an available vehicle includes at least one of the following activities: (1) determining a virtual bus stop for the new passenger's pickup, within reasonable walking range of the passenger-requested point of origin, (2) determining a virtual bus stop for the new passenger's drop off, within reasonable walking range of the passenger-requested destination, (3) adjusting the drop off points for passengers assigned to a vehicle, where the drop off points may only be adjusted and where pickup points are unchangeable once the exemplary computer transportation system delivers the pickup point to the passenger), (4) determining an order of pickups and drop offs, (5) determining a route between pickup and drop off points, or any combination thereof.

In some embodiments, the computer transportation systems of present invention are configured to determine each virtual bus stop of a plurality of virtual bus stops of a vehicle's (e.g., but not limited to, a car, a van, a trolley, a bus, etc.) route, where each virtual bus stop is within a "reasonable walking distance" of the passenger-requested origin point and/or destination point. As used herein, the terms "reasonable walking distance" and "reasonable walk" refer interchangeably to: (1) a distance between a passenger's designated origin point and a virtual bus stop, (2) a direction of travel of the road on which the requested destination point is located (e.g., but not limited to, a passenger standing on a road opposite the direction of travel may be more amenable to walking than a passenger standing on a road in the direction of travel), (3) identifying additional pickup and/or drop off points (i.e., pickup and/or drop off virtual bus stops), which may correspond to shorter walking distance, thus causing other pickup and/or drop off points to be less amenable.

Exemplary Calculations of the Reasonable Walk

As used herein, the term "absolute walk" refers to an actual walking distance to a virtual bus stop, which can be calculated for example by a map containing walking paths in a digital form or through geometrical measures such as Euclidian distance or, for example, but not limited to, Manhattan (L1) distance.

As used herein, the term "additional walk," as used herein, refers to an amount of "unnecessary" walking to a virtual bus stop, i.e., the distance beyond the distance to the nearest natural relevant alternative.

In some embodiments, a reasonable walk can range from, e.g., but not limited to, 1-300 meters. In some embodiments, a reasonable walk can range from, e.g., but not limited to, 1-250 meters. In some embodiments, a reasonable walk can range from, e.g., but not limited to, 1-200 meters. In some embodiments, a reasonable walk can range from, e.g., but not limited to, 1-150 meters. In some embodiments, a reasonable walk can range from, e.g., but not limited to, 1-100 meters. In some embodiments, a reasonable walk can range from, e.g., but not limited to, 1-50 meters. In some embodiments, a reasonable walk can range from, e.g., but not limited to, 50-300 meters. In some embodiments, a reasonable walk can range from, e.g., but not limited to, 100-300 meters. In some embodiments, a reasonable walk can range from, e.g., but not limited to, 150-300 meters. In some embodiments, a reasonable walk can range from, e.g., but not limited to, 200-300 meters. In some embodiments, a reasonable walk can range from, e.g., but not limited to, 250-300 meters. In some embodiments, a reasonable walk can range from, e.g., but not limited to, 50-250 meters. In some embodiments, a reasonable walk can range from, e.g., but not limited to, 100-200 meters.

Example of an Absolute Walk and an Additional Walk

In some embodiments, if the absolute walk to a first virtual bus stop is 200 meters, but there is a second virtual bus stop at 50 meters, the first virtual bus stop has an additional walk of 150 meters (i.e., 200 meters–50 meters=150 meters).

Exemplary Rule(s) Utilized in Determining Virtual Bus Stops

For example, in an embodiment of the exemplary computer transportation system of the present invention, the exemplary rule(s) utilized in determining virtual bus stops are provided below.

In some embodiments, for example, pickup and drop-off virtual bus stops can be regarded as natural virtual bus stops if they are along main roads. For example, the computer transportation systems of present invention are configured to recognize directed main roads based on "natural" and/or "nearest" criteria. For example, riders can be more amenable to walking when there would be no natural point (e.g., an existing main road (e.g., a central street in a town)) nearby. In some embodiment, pickup and dropoff virtual bus stops can be in the general direction of the ride, along main roads (i.e., a major road for any form of motor transport, (e.g., avenues in Manhattan, N.Y.)). In some embodiments, drop-off virtual bus stops can be in any direction, and any road (except for example dead ends). In some embodiments, drop-offs that are on main roads along the rides direction can be counted as "nearest" for the purpose of determining the additional walk of other alternatives.

In some embodiments, pick-up virtual but stops can be also along cross streets and or on main roads against ride direction. An exemplary embodiment of the present invention may allow for pick-ups which are not along the direction of ride in accordance with the detouring effect and/or increased wait time they impose on existing riders and/or riders that are already assigned to the same vehicle. Consequently, a particular vehicle can pick-up passengers during the same ride at the same or different points: along main road(s) in the direction of the ride, along cross-street(s), and on points which are not the direction of ride (e.g., opposite side of a main road).

In some embodiments, the computer transportation systems of present invention are configured such that the absolute walk has a length of 50-500 meters (m). In some embodiments, the computer transportation systems of present invention are configured such that the absolute walk has a length of 300-400 m. In some embodiments, the computer transportation systems of present invention are configured such that the absolute walk has a maximum length of 360 m.

In some embodiments, the computer transportation systems of present invention are configured such that the additional walk has a length of 0-400 meters (m). In some embodiments, the computer transportation systems of present invention are configured such that the additional walk has a length of 150-250 m. In some embodiments, the computer transportation systems of present invention are configured such that the additional walk has a maximum length of 180 m.

In some embodiments, the computer transportation systems of present invention are configured such that the sum of the absolute walk and the additional walk has a length of 50-900 m. In some embodiments, the computer transportation systems of present invention are configured such that the sum of the absolute walk and the additional walk has a length of 300-400 m. In some embodiments, the computer transportation systems of present invention are configured such that the sum of the absolute walk and the additional walk has a maximum length of 360 m (this rules implies the previous two rules).

In some embodiments, the computer transportation systems of present invention are configured to determine the reasonable walking distance based, at least in part, on the absolute walk and the additional walk.

The exemplary rules should not be deemed limiting and other similarly suitable rules are being contemplated; moreover, not all rules but some rules can be utilized to determine locations of virtual bus stops. For example, boarding virtual bus-stops can be treated the same as disembarking virtual bus-stop, where only points on suitably directed main roads can be natural but-stops, and riders are more amenable to walking when there's no natural point nearby.

Examples Using the Rules:

The following examples of some embodiments of the exemplary computer transportation system of the present invention are based on using the exemplary computer transportation system in Manhattan, N.Y., U.S.A. However, these examples are illustrative and not restrictive, and may be applied to any city or community.

1. Origin on 46th and 10th, Going Uptown:

For example, in an embodiment of the exemplary computer transportation system of the present invention, since 10th Avenue goes uptown, there's a virtual bus stop near the origin (0-40 m, depending on exact point of origin). 11th Avenue is 270 m away from 10th, and can also be used for uptown pickups. However, the "additional walk" to 11th is calculated relative to the walk to the nearest virtual bus stop (on 10th), and is above 180 m, so 11th Avenue would not be considered in this example. A 1-2 block walk is allowed along 10th if the car's route requires it (at 80 m per block, it's less than 180 m of additional walk).

2. Origin on 80th and 1st, Going Downtown:

For example, in an embodiment of the exemplary computer transportation system of the present invention, 1st Avenue goes uptown, so virtual bus stops along 1st avenue are not considered for rides going downtown. This means that the nearest virtual bus stops are on York and 2nd (220 m and 235 m from 1st, respectively). These are within the 360 m limit. They're also within the 180 m additional walk limit, since there's no closer virtual bus stop. The additional walk for York is 0 m (it's the nearest stop) and the additional walk for 2nd is 15 m (because it's 15 m more than York). Thus, both York and 2nd would be considered.

3. Origin on 80th and Madison, Going Downtown:

For example, in an embodiment of the exemplary computer transportation system of the present invention, again, Madison itself is not considered, because it's going uptown. 5th and Park (both 150 m away) are the nearest relevant virtual bus stops, and are considered. Lexington is 160 m beyond park. The absolute walk is 310 m (which falls within the rules in this example). The additional walk is 160 m (which falls within the rules in this example). However, the sum of the two measures is 460 m, which is over 360 m, so Lexington is not considered. Since passengers already are walking a block to the next avenue, they will not need to walk yet another "unnecessary" block.

4. Destination on 80th and 1st, Coming from Uptown:

In an embodiment of the exemplary computer transportation system of the present invention, the following example is similar to example #2; however, virtual bus stops on 1st Avenue (against the ride direction) and virtual bus stops on 80th (not a main road) would also be considered as such constraints may not be applicable to drop-offs. However, these "secondary" options would not count when figuring the additional walk of other points. This means that the primary points on York and 2nd (220 m and 235 m away) would also be considered. The passenger would be brought home (coming from uptown, making a detour back to 1st) if possible, but the passenger would walk from 2nd or York if there are further dropoffs downtown.

An Illustrative Example of Determining a Reasonable Passenger Route

In some embodiments, the present invention includes computer transportation systems configured to determine a reasonable route from origin and destination locations. In some embodiments, an evaluation of a route to determine if the route is a reasonable route includes: (1) time, where time of the route is measured as about the same amount of time as the direct route (e.g., but not limited to, 5%, 10/o, 15%, or 20% etc. longer in duration than the direct route) and/or (2) geometry, where the route increases only slightly (e.g. but not limited to, by 50 m, 100 m, 150 m, 200 m, etc.) geometrical detour(s) (e.g., but not limited to, traveling north 200 m and then traveling back south again, leading a 200 m*2=400 m overall geometrical detour). For example, depending on traffic, a route that travels back and forth may still be shorter in duration than a geometrically direct route.

In some embodiments, the present invention includes computer transportation systems employing at least one routing algorithm which takes into account data from at least one of offline or real-time traffic data from at least one of external electronic data sources and/or internal data generated by the exemplary computerized transporting system of the present invention based on, for example but not limited to, a speed of vehicles being controlled.

In some embodiments of the current invention, the computer transportation systems of present invention are configured to determine, in real-time, a vehicle route by a time duration and an overall distance, such that a speed-based geometrical detour would not be preferred, if such detour results in only a slightly shorter expected duration of the trip.

In some embodiments of the current invention, the computer transportation systems of present invention are configured to dynamically determine, in real time, the passenger route with the continuously updatable virtual bus stops by a combination of time duration and demand factors. For example, a routing through high demand areas can be preferred. In some embodiments of the current invention, the computer transportation systems of present invention are configured to dynamically determine, in real time, the passenger route with the continuously updatable virtual bus stops by utilizing a combination of time duration and demand factors. For example, the computer transportation systems of present invention are configured to account for the demand only in case when vehicle(s) is (are) partially occupied In some embodiments of the current invention, the computer transportation systems of present invention are configured to dynamically determine, in real time, the passenger route with the continuously updatable virtual bus stops by a combination of time duration, demand, and toll routes factors, such that routing through toll routes is not preferred unless it saves significant cost overall, and/or routing through toll routes is preferred only in case driver and/or passengers acceptance.

In some embodiments, the exemplary computer transportation systems of the present invention are further configured to assign a vehicle, among the vehicles connected to the computer transportation system, to a ride requested by a passenger. In some embodiments of the current invention, the computer transportation systems of present invention are configured to dynamically filter candidate vehicle(s) to include only those vehicles in which one or more of the following conditions apply:
  distance to requested origin shorter than a threshold (e.g., but not limited to 1 km, 2 km, 3 km, 4 km, etc.);
  expected time of arrival to a virtual but-stop closest to the origin is less than a threshold (e.g., but not limited to 5, 10, 15, 20 minutes etc.,);
  a number of candidate vehicles do not exceed a threshold (e.g., but not limited to 10, 50, 100, 150, 250, 500 vehicles etc.);
  location(s) where the ordering of candidate vehicle(s) are/is based on a distance and/or expected time of arrival (ETA).

In some embodiments of the current invention, the computer transportation systems of present invention are configured to dynamically assign a single vehicle among the candidate vehicles or among all vehicles to a passenger request, based on, but not limited on, at least one of: costs associated with boarding at virtual but-stops, costs associated with disembarking at virtual bus-stops, and a possible ordering with respect to existing tasks. In some embodiments of the current invention, the vehicle assigned to a request is the one with minimal associated cost, and/or minimal suggested ETA, and/or minimal associated ride duration, to each an/or all passengers, and any combination thereof. In some embodiment of the current invention, the computer transportation systems of present invention are configured to dynamically determine the vehicle to be assigned to a request according to at least one of:
  passenger's preference(s) such as, but not limited to, ride duration, ETA, price, etc.;
  maximum expected contribution to vehicle's profitability;
  maximal expected profitability associated with request;
  minimal cost, and
  any combination thereof. etc.

For example, in a scenario when the exemplary computer transportation system of present invention determines the presence of a vehicle supply constraint, the exemplary computer transportation system of present invention is configured to assign a vehicle according to maximum expected profitability associated with request, while otherwise, vehicle is chosen according to minimal cost.

Exemplary Calculations for Meeting a Future Demand

In some embodiments, the exemplary computer transportation systems of the present invention are configured to assign a plurality of passengers (e.g., 2, 3, 4, 5, 6, etc.) to a vehicle by: selecting routes between virtual bus stops, where the virtual bus stops pass through at least one high demand area(s), and where the exemplary computer transportation systems of the present invention create "demand-point tasks", which are a plurality of points on a map, where each point of the plurality of points has a designated preference level, determined as detailed below, and where a distribution of (i) the plurality of points and (ii) the preference level of each of the plurality of points is based on a demand model, as detailed below.

In some embodiments, the exemplary computer transportation systems of the present invention are configured to assign a plurality of passengers (e.g., 2, 3, 4, 5, 6, 7, 8, etc.) to a vehicle to meet future demand, by: delivering instructions to each passenger of a plurality of passengers to travel a reasonable walking distance to a high demand area, where each vehicle of a plurality of vehicles move to a plurality of high demand areas (e.g., but not limited to, instructing each vehicle of a plurality of vehicles to move to an area close to each vehicle's current location), and spreading vehicles out between different high demand areas, in proportion to the demand in each high demand area.

Demand Point Tasks: Explanations and Illustrative Examples

As used herein, "Demand points" refer to sets of points through which every ride in a certain area (i.e., demand area) would have to pass.

For example, in an embodiment of the exemplary computer transportation system of the present invention, every ride going uptown from below 50th to above 50th cross st. in Manhattan, would have to cross 50th somewhere. This means that a set of demand points just below 50th is created, on each uptown-bound avenue (1st, 3rd, Park, Madison, 6th, 8th, 10th, West End). Whenever an uptown ride needs to cross 50th, a "demand-point task" is added to the car, in addition to the pickup and drop-off tasks for the various passengers. This demand-point task is invisible to the driver, but might affect routing choices. The demand-point task has several locations at which it can be resolved. In this example, the demand-point task could be resolved in any of the 8 uptown avenues, just below 50th. When the route for the car is built or modified, the exemplary computer transportation systems are configured to determine which of those locations the car will pass through.

For example, in an embodiment of the exemplary computer transportation system of the present invention, since the demand-point task needs to be resolved at one of the designated locations, the demand-point task prevents a route that goes around those locations.

For example, when driving a Midtown pickup to an Upper East Side (UES) dropoff, the Franklin D. Roosevelt East River (FDR) Drive will not be used, as that prevents any further pickups for that car. Having to cross 50th (and some other streets) in a location from the designated set (which does not include FDR) prevents an FDR route from being built. In some embodiments of the current invention, the computer transportation systems of present invention are configured to ignore the demand-point tasks in cases when the vehicle occupancy is at least at a certain number (e.g., but not limited to, 1, 2, 3, etc. passengers present in the vehicle and/or e.g., but not limited to, 0, 1, 2, 3, etc. empty seats are available). For example, in case of Manhattan, NYC, the exemplary computer transportation systems of present invention can be configured to allow the routing through the FDR would be allowed if there would be a sufficient number (exceeding a pre-determined number) of passengers inside the vehicle.

In some embodiments, each possible location for the demand-point task is assigned a cost based on the demand. For example, in the evening commute, there is increased demand from Midtown to UES, but that demand is centered around central Midtown (Park, Madison, and to a less extent 6th and 3rd). There is a smaller demand (i.e., fewer passengers that compared to, e.g., but not limited to, Midtown) in the peripheral avenues (1st, 8th, 10th, 11th). In this case, the exemplary computer transportation systems are configured to assign passengers located at the central avenues low costs, while the passengers located at the peripheral avenues would be assigned higher costs.

In some embodiments, when the exemplary algorithm calculates the possible routes, demand costs are taken into account, penalizing the peripheral avenues. For example, a route through a central avenue would have a higher likelihood of being chosen, even if the peripheral avenue is a few minutes faster (as long as the central avenue is compatible with the pickups and drop-offs for that car).

In some embodiments, when a car is full (so further demand is irrelevant) or close to be full, demand point tasks are ignored, and the exemplary computer transportation systems deliver instructions for the vehicle to travel the fastest route or according to combination of time and duration.

The exemplary usage of demand-tasks should not be deemed limiting and other similarly suitable demand-based routing methods may be used. For example, demand costs may be added on each road and the routing algorithm may calculate possible routes based on any combination of duration, distance, and/or demand.

Exemplary Algorithmic Calculations

In some embodiments, the transportation methods of the present invention include: routing calculations to identify the fastest route from A to B on a map by determining routes between a plurality of possible virtual bus stops for a plurality of passengers transported by a plurality of vehicles, where the calculation can result in between 100-100,000 routing queries per calculation (e.g., but not limited to, 1,000; 5,000; 10,000, etc.), and where routing calculation is calculated in real-time. (e.g., from nanoseconds to 20 seconds; from microseconds to 20 seconds, from milliseconds to 20 seconds; from 1 second to 20 seconds).

In some embodiments, the transportation methods include defining a set of points on the map (e.g., but not limited to, 10 points, 100 points, 1,000 points, etc.), between which the routes are pre-calculated and stored (e.g., the driving times for each of the routes). In some embodiments, the passenger-entered points are calculated by: (i) using stored points from the set, (ii) calculating the driving time, and (iii) adjusting for the determined point. In some embodiments, each point of a set of points is a location reference having at least one identifying characteristic (e.g., but not limited to, gas stations, museums, restaurants, hotels, schools, theaters, etc.)

In some embodiments, the transportation methods of the present invention further include a selection calculation, where the selection calculation is performed by utilizing at least one algorithm, and where the at least one algorithm solves complex problems by recursively solving smaller problems of the same type, such as, but not limited to, routing and virtual but-stop and demand-point tasks selection discussed herein.

In some embodiments, the transportation methods of the present invention further include vehicle filtering to improve performance times, where the vehicle filtering includes performing a preliminary calculation regarding each vehicle of a plurality of vehicles, and filter each vehicle of a plurality of vehicles based on the geometrical correspondence between each vehicle's existing route and the new passenger request. In some embodiments, this initial calculation does not include the particulars of the road map or the distribution of virtual bus stops. In some embodiments, only vehicles that pass this initial calculation (i.e., filtering) are considered for assignment.

Figure 5:
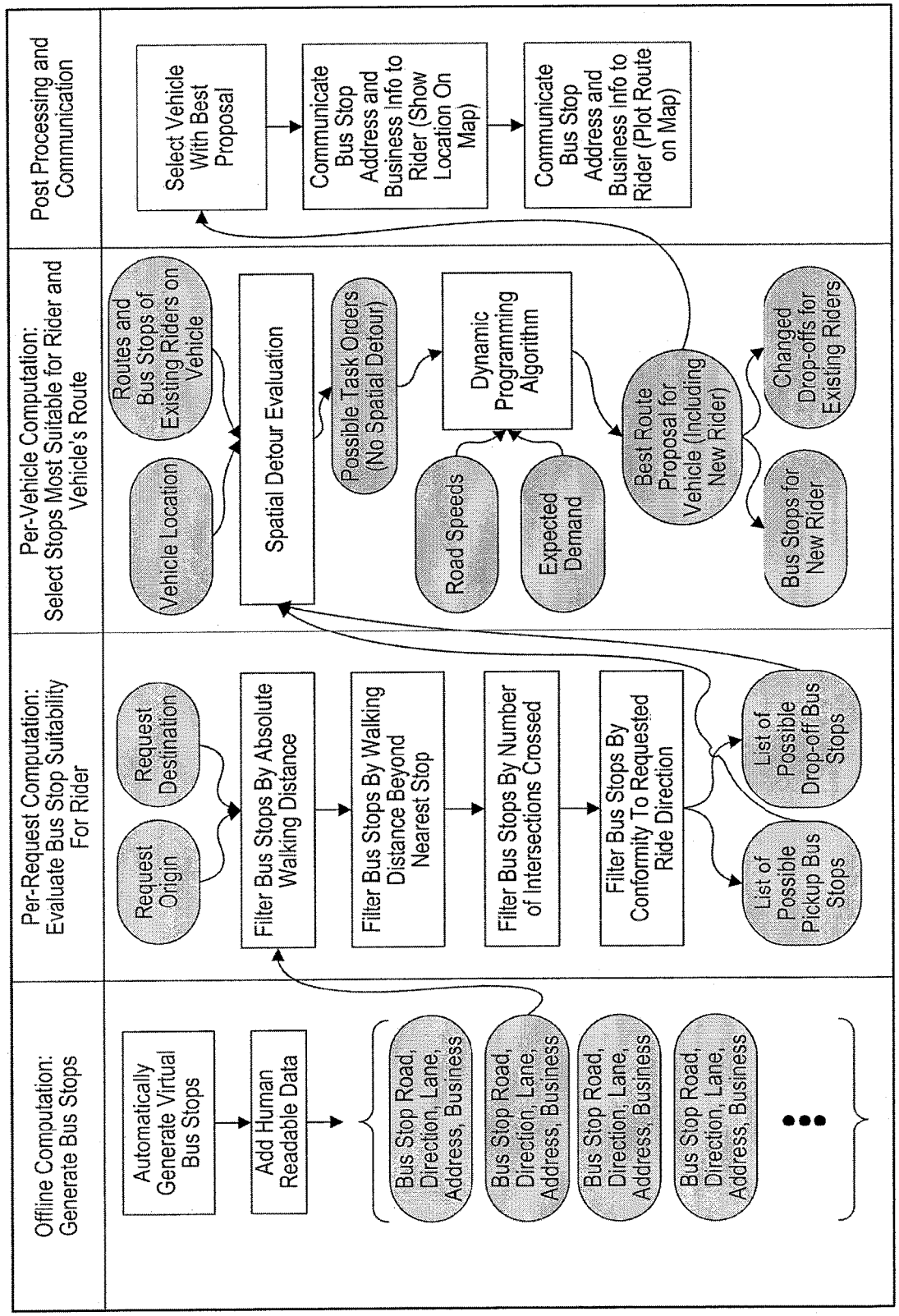
FIGS. 5-7 illustrate certain aspects of some embodiments of the present invention.
Figure 6:
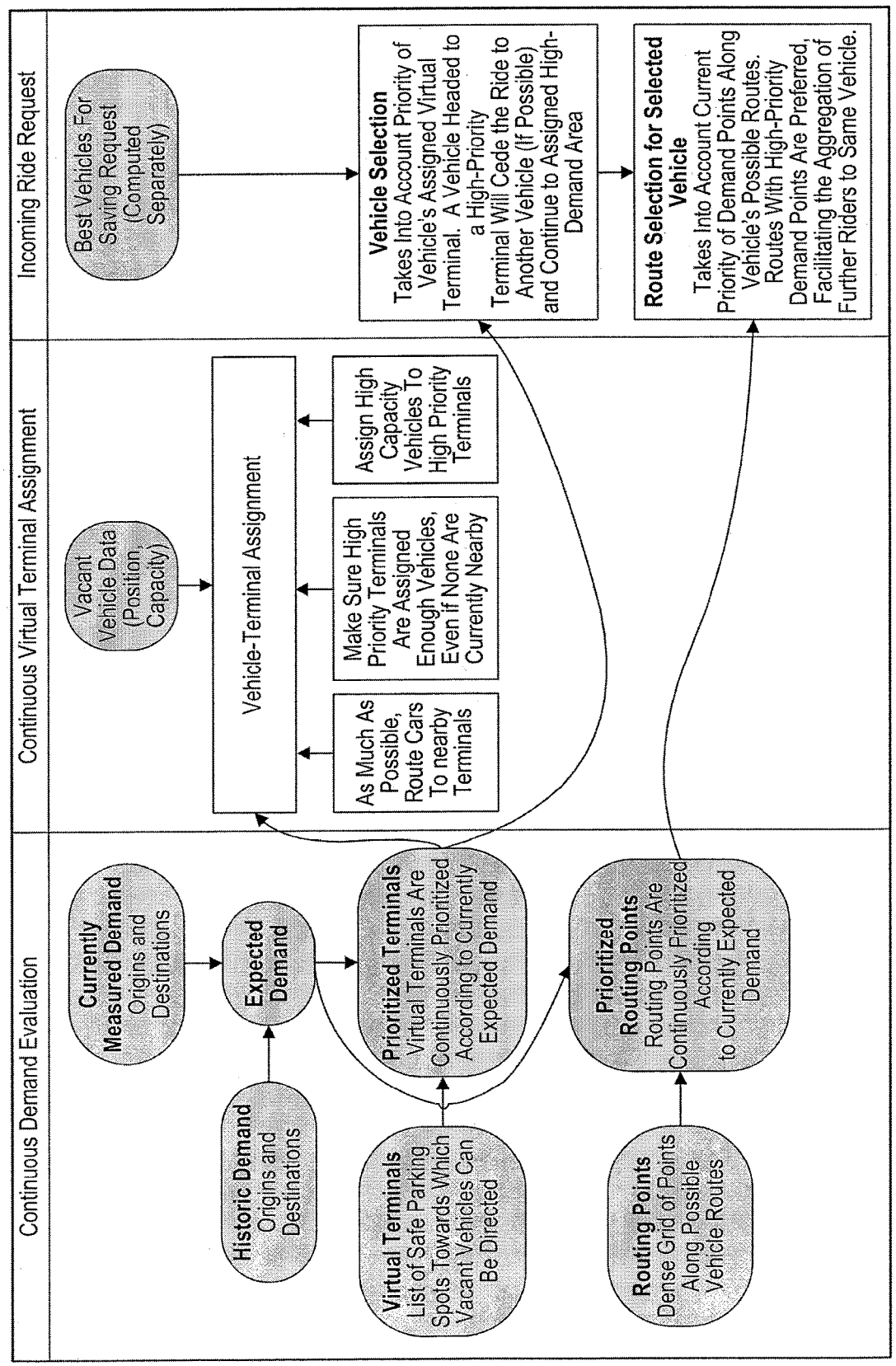

FIG. 5 is a diagram illustrating an embodiment of the exemplary computer transportation system of the present invention, showing virtual bus stops. FIG. 6 is a diagram illustrating an embodiment of the exemplary computer transportation system of the present invention, showing expected demand driven routing using demand-tasks.

Examples of Virtual Bus Stops

Table 1 illustrates an exemplary grid of virtual bus stops determined in accordance with principles of the present invention discussed herein.

Exemplary Dynamic Pre-Generation of Virtual Bus Stops

In some embodiments of the exemplary computer transportation systems of the present invention, each virtual bus stop of a plurality of virtual bus stops is dynamically put at the beginning of every block, right after and/or right before a particular intersection and/or at the middle of a block. In some embodiments, the beginning of the block is used rather than the end of the block, because this gives the driver time to switch lanes after leaving the stop (based on the driver's route from the stop). In some embodiments, virtual bus stops on all roads are used, except e.g., but not limited to, dead ends. In some embodiments, a drop-off virtual bus stop can safely be chosen that is convenient for a passenger, even if it is not as accessible in general. In some embodiments, when additional passengers are added to the car, the drop-off of existing passengers may be dynamically adjusted in real-time to different virtual bus stop(s), according to, for example but not limited to, the best associated cost.

TABLE 1

|   | A | B | C | D | E | F | G | H |
|---|---|---|---|---|---|---|---|---|
| 1 | lat | lng | bearing | corner | direction | place_of_buisness | street | number |
| 2 | 40.73961042 | −73.9824458 | 29.100800deg | NE | out | Inoteca | 3rd Ave | 323 |
| 3 | 40.78192243 | −73.9719515 | −151.436000de | SW | out | Museum of Natural History Subway Entranc | Central Park West | 211 |
| 4 | 40.78187015 | −73.9808066 | 14.873600deg | NE | out | 1st Republic | Broadway | 2162 |
| 5 | 40.77195579 | −73.9501648 | −149.697000de | SW | out | D'Agostino | York Ave | 1507 |
| 6 | 40.77234418 | −73.9897909 | 28.733500deg | NE | out | The Abraham Joshu Heschel School | West End Ave | 20 |
| 7 | 40.80364846 | −73.9668369 | 28.672400deg | NE | out | Chase Bank | Broadway | 2824 |
| 8 | 40.77581 | −73.9533843 | −151.032000de | SW | out | Item Boutique | 2nd Ave | 1595 |
| 9 | 40.75224819 | −73.9782219 | 119.227000deg | SE | out | One Grand Central Place | 42nd Sr | 60 |
| 10 | 40.79011587 | −73.9476957 | −151.096000de | SE | out | Lex & 103 Inc | Lexington Ave | 1629 |
| 11 | 40.78731031 | −73.9479213 | 29.026300deg | NW | out | Next Evolution Mixed MMA | 3rd Ave | 1786 |
| 12 | 40.78633118 | −73.950451 | −151.022000de | SE | out | Preschool of America | Lexington Ave | 1501 |
| 13 | 40.78711271 | −73.9772923 | 32.586600deg | NE | out | Gamestop | Broadway | 2322 |
| 14 | 40.78378227 | −73.9814653 | 29.975600deg | NE | out | The Apthorp | West End Ave | 390 |
| 15 | 40.78299534 | −73.9573851 | 29.094700deg | NW | out | Jacadi Paris | Madison Ave | 1242 |
| 16 | 40.80122996 | −73.9681345 | −174.673000de | SW | out | KFC | Broadway | 2753 |
| 17 | 40.76326576 | −73.9966773 | −150.594000de | SW | out | Daisy May's BBQ | 11th Ave | 623 |
| 18 | 40.7700495 | −73.9668294 | −28.902000deg | NW | out | Cartier | Madison Ave | 828 |
| 19 | 40.74796929 | −73.9829386 | −28.798900deg | NW | out | NYPL of Science Industry & Business | Madison Ave | 188 |
| 20 | 40.76754833 | −73.9686509 | 28.938100deg | NW | out | Giorgio Armani | Madison Ave | 760 |
| 21 | 40.79029705 | −73.9747363 | 29.229100deg | NE | out | Pinky | Broadway | 2424 |
| 22 | 40.79281306 | −73.9729058 | 29.562800deg | NE | out | Broadway Church of Christ | Broadway | 2500 |
| 23 | 40.76122 | −73.97325 | 28.700000deg | NW | out | Sony | Madison Ave | 550 |
| 24 | 40.76910687 | −73.9921438 | 28.701700deg | NE | out | Audi Manhattan | 11th Ave | 798 |
| 25 | 40.76152999 | −73.971047 | −151.138000deg | SW | out | Phillips de Pury & Company | Park Ave | 450 |
| 26 | 40.77869109 | −73.9742859 | −151.067000de | SW | out | 4th Universalist Society | Central Park West | 160 |
| 27 | 40.77651726 | −73.9621333 | −30.218400deg | NW | out | J. Crew | Madison Ave | 1040 |
| 28 | 40.78889165 | −73.3762919 | −146.896000de | SW | out | CapitalOne | Broadway | 2379 |
| 29 | 40.78785 | −73.94426 | −151.427000deg | SE | out | Metropolitan Pharmacy | 2nd Ave | 1982 |
| 30 | 40.76734394 | −73.9662475 | 28.920300deg | NE | out | Park Avenue Armory | Park Ave | 643 |
| 31 | 40.75834728 | −73.9733625 | −151.139000deg | SW | out | Fidelity Investments | Park Ave | 350 |
| 32 | 40.74405893 | −73.9834083 | 28.923400deg | NE | out | Fresh & Co | Park Ave | 425 |
| 33 | 40.74287235 | −73.9892963 | −174.303000de | SW | out | 40/40 Club | Broadway | 1115 |
| 34 | 40.79989427 | −73.9679408 | 12.346900deg | NE | out | Ben & Jerry's | Broadway | 2722 |
| 35 | 40.74259353 | −73.9847472 | −151.262000deg | SW | out | Hillstone | Park Ave | 378 |
| 36 | 40.75661024 | −73.974077 | 28.920500deg | NE | out | The Waldorf Astoria | Park Ave | 301 |
| 37 | 40.76960854 | −73.9823632 | 177.536000deg | SW | out | Giuliano Global Center | Broadway | 1849 |
| 38 | 40.77707894 | −73.9524605 | −150.912000deg | SW | out | MexiBBQ | 2nd Ave | 1631 |
| 39 | 40.78099034 | −73.9706821 | 28.922100deg | NE | out | T. Anthony Ltd | Park Ave | 445 |
| 40 | 40.7446 | −73.97585 | −150.100000deg | SE | out | New York Sports Club | 2nd Ave | 614 |
| 41 | 40.78236131 | −73.9578472 | 28.626600deg | NW | out | Corcoran | Madison Ave | 1226 |
| 42 | 40.76942919 | −73.967284 | 29.078000deg | NW | out | Belstaff | Madison Ave | 814 |
| 43 | 40.75048678 | −73.981105 | 28.630900deg | NW | out | Chase | Madison Ave | 260 |
| 44 | 40.73726072 | −73.9883591 | 28.99600deg | NE | out | Flushing Bank | Park Ave | 225 |
| 45 | 40.743831 | −73.9838456 | −151.101000deg | SW | out | Lacoste | Park Ave | 418 |
| 46 | 40.77238243 | −73.9819655 | −0.107681deg | NE | out | Lululemon Athletica | Broadway | 1926 |
| 47 | 40.786342 | −73.9783992 | 150.823000de | SW | out | Taylor's Shoes | Broadway | 2299 |
| 48 | 40.75973954 | −73.9717945 | 28.921400deg | NE | out | Atlantic Bank | Park Ave | 405 |
| 49 | 40.76532 | −73.982162 | 167.000000de | SW | out | CapitalOne | Broadway | 1745 |
| 50 | 40.77520735 | −73.9630677 | 28.951400deg | NW | out | Zadig & Voltaire | Madison Ave | 992 |

In some embodiments of the exemplary computer transportation systems of the present invention, after virtual bus stops are dynamically generated according to the above rules, the exemplary computer transportation systems can be configured to allow administrators of the exemplary computer transportation systems of the present invention to:
1. change and/or remove "bad" stops (no stopping, or no convenient access to sidewalk);
2. on one-way roads, identify stops that need to be moved to left side of street (because of bus lanes, sidewalk access, etc.);
3. add business information or additional useful information that would help drivers and passengers identify the correct rendezvous; and
4. any combination thereof.

Illustrative Examples of Spatial Detour Prevention

In some embodiments, the exemplary computer transportation systems are configured to communicate a route to a passenger and/or driver by using, for example but not limited to, via an electronic device having a specifically programmed graphical user interface (GUI). In some example, the detour instruction can be present in the form of: text, graphical signs, audio sounds, being juxtaposed over and/or embedded in a map of a related geographic area, and any combination thereof. In some cases, the route may contain detour instruction(s) (e.g., go east, and then back west). For example, a detoured route with updated virtual bus stop(s) can be generated by the exemplary computer transportation system of the present invention after determining, utilizing the at least one routing algorithm that the detoured route would be sufficiently faster due to traffic over an original route, for example but not limited to, when using a longer route through a highway.

For example, a detoured route with updated virtual bus stop(s) can be generated by the exemplary computer transportation system of the present invention after determining, utilizing the at least one routing algorithm that a detour is needed for another passenger to be picked up or dropped off in the same vehicle.

In some embodiments, the exemplary computer transportation systems is configured not to avoid routing which includes detour for any of the two reasons above, but to avoid passenger aggravation, geometrical detours can be limited to 50-1000 m. In some embodiments, the geometrical detours can be limited to 350-450 m. In some embodiments, the geometrical detours can be limited to a maximum length of 400 m (e.g., one short avenue block, or two street blocks (back and forth) in Manhattan, N.Y. City).

In some embodiments, the exemplary computer transportation system of the present invention can be configured to dynamically determine, in real-time, the fastest route that serves multiple passengers while observing spatial detour limits by utilizing, but not limited to, at least one of the following four steps:
1. Identify reasonable pickup and or drop-off virtual bus stops for at least a subset of passengers on the vehicle and or assigned to be picked up by vehicle;
2. Pre-filtering: for each task (pickup or dropoff), remove all stops that would cause an excessive detour (at this point, a virtual bus-stop is only removed from consideration if it necessarily causes a detour (no matter which bus-stops are selected for other tasks));
3. Use at least one routing algorithm of the present invention described herein to calculate a route using virtual bus-stops that survived steps 1 and 2; and
4. Verify that final route causes no excessive detour for any passengers.

Illustrative Examples of Dynamic Route Selection with Virtual Bus Stops Assignment In some embodiments, given a list of pickup and drop off tasks, the calculated virtual bus stop for each task is selected by the exemplary computer transportation system.

Figure 7:
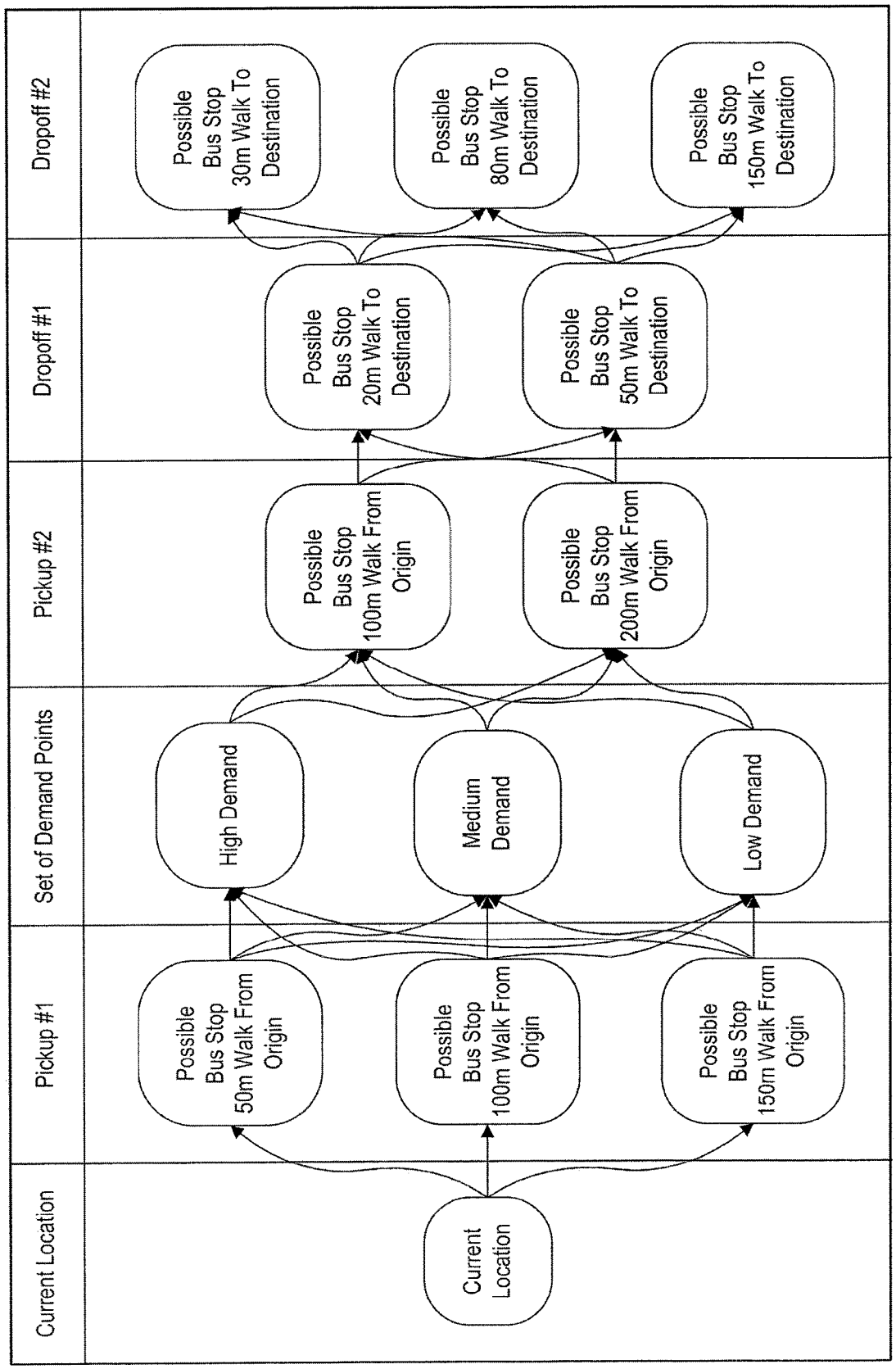

FIG. 7 illustrates an embodiment of the dynamic route-virtual bus stop selection algorithm being executed by the exemplary computer transportation system of the present invention. For example, as FIG. 7 illustrates, the exemplary dynamic route-virtual bus stop selection algorithm which is configured to select among a plurality of potential alternatives for each virtual bus stop (e.g., Pickup #1, Pickup #2, Dropoff #, Dropoff #2) to be assigned to passenger(s) who already requested the service and, in addition, to also select among a plurality of potential "demand point" at least one "demand point" task that the vehicle would need to perform. The columns correspond to one possible location (virtual bus stop, or demand-point). Each task has a cost associated with it, based on how much walking is required (for a pickup or drop-off) or how much demand is expected at that point (for a demand point). Each arrow represents a potential route from a possible location for one bus-stop or demand-point task, to a possible location for the next but-stop or demand-point task. Each arrow has a cost associated with it, based on the driving time, and based on the number of passengers that are affected by that drive (on board the car, or waiting for it).

FIG. 7 further illustrates starting from the car's current location, then choosing from 3 possible virtual bus stops for the first pickup, each with an associated walking distance. After pickup, the exemplary computer transportation system is configured to choose between 3 possible designated demand-points, each with its own evaluation based on expected demand. The exemplary computer transportation system is configured then to choose between 2 possible virtual bus stops for another pickup, 2 possible virtual bus stops for the first passenger's drop-off and finally 3 possible stops for the second passenger's drop-off. In this example, there are at least 3×3×2×2×3=108 possible real-time selections, which translate into making selection among at least 108 possible routes.

Illustrative Examples of Cost Function

In some embodiments, the exemplary computer transportation systems of the present invention are configured to dynamically calculate and select, utilizing the exemplary dynamic route-virtual bus stop selection algorithm of the present invention, a route that minimizes a cost function accounting for at least one of the following factors:
1. Duration each passenger spends in the car;
2. Duration each passenger spends waiting;
3. Duration each passenger spends walking from origin to pickup and from drop-off to destination;
4. Duration in which car is held up (i.e., until final drop-off);
5. Cost of chosen demand point (higher cost for low demand);
6. Any combination thereof.

Table 2 provides an illustrative computer script which can be utilized to specifically configure the exemplary computer transportation system of the present invention to dynamically calculate and select, in real time, an updatable route having a plurality of virtual bus stops. For example, the illustrative computer script of Table 2 is configured to consider up to 15 demand-point tasks (including multiple sets of demand points) with more than 10 possible locations for some of the demand-point tasks, which can result in more than a billion possible routes. For example, the illustrative computer script of Table 2 is configured to compute the cost for the best sub-route ending in a particular location in a particular layer is computed, after the best sub-routes ending at each location in the previous layer are known.

TABLE 2

```
for task in task_list:
    for location in task:
        min_route_cost = infinity
        for prev_location in task.previous:
            route_cost = prev_location.route_cost
                + driving time(prev_location, location)
                    * driving_weight(task)
                + location.cost
            if route_cost < min_route_cost:
                min_route_cost = route_cost
                location.back_reference = previous_location
final_location = min(last_task, key=route_cost)
route = [final_location]
while route[0].back_reference is not null:
    route.insert(0, route[0].back reference)
```

In one example, to figure out the calculated route ending in a particular location of a particular task, the exemplary computer transportation system is configured to go over all locations for the previous task. And, since the exemplary computer transportation system is configured to go over tasks in order, the best route ending in each of these previous locations would be computed.

In some embodiments, for each previous location, the exemplary computer transportation system is configured to take the cost for previous location's calculated route, add the driving time from the previous location to the current location (weighted by the number of passengers affected by it), add the cost (walking/demand) for the new location, and get the route cost for the new location.

In some embodiments, taking the calculated cost out of all options for previous locations, the exemplary computer transportation system is configured to get the final best cost for a route ending in the current location. The exemplary computer transportation system is configured to do this for each location in the current layer, and proceed to the next layer.

Illustrative Operating Environments

FIG. 1 illustrates one embodiment of an environment in which the exemplary computer transportation system of the present invention may operate. However, not all of these components may be required to practice the invention, and variations in the arrangement and type of the components may be made without departing from the spirit or scope of the invention.

In some embodiments, the inventive system and method may include a large number of members and/or concurrent transactions. In other embodiments, the inventive system and method are based on a scalable computer and network architecture that incorporates various strategies for assessing the data, caching, searching, and database connection pooling. An example of the scalable architecture is an architecture that is capable of operating multiple servers.

In embodiments, members of the exemplary computer transportation system of the present invention 102-104 include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In embodiments, programming may include either Java, .Net, QT, C, C++ or other suitable programming language.

In embodiments, member devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like or a Proprietary protocol.

In embodiments, network 105 may be configured to couple one computing device to another computing device to enable them to communicate. In some embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 2:
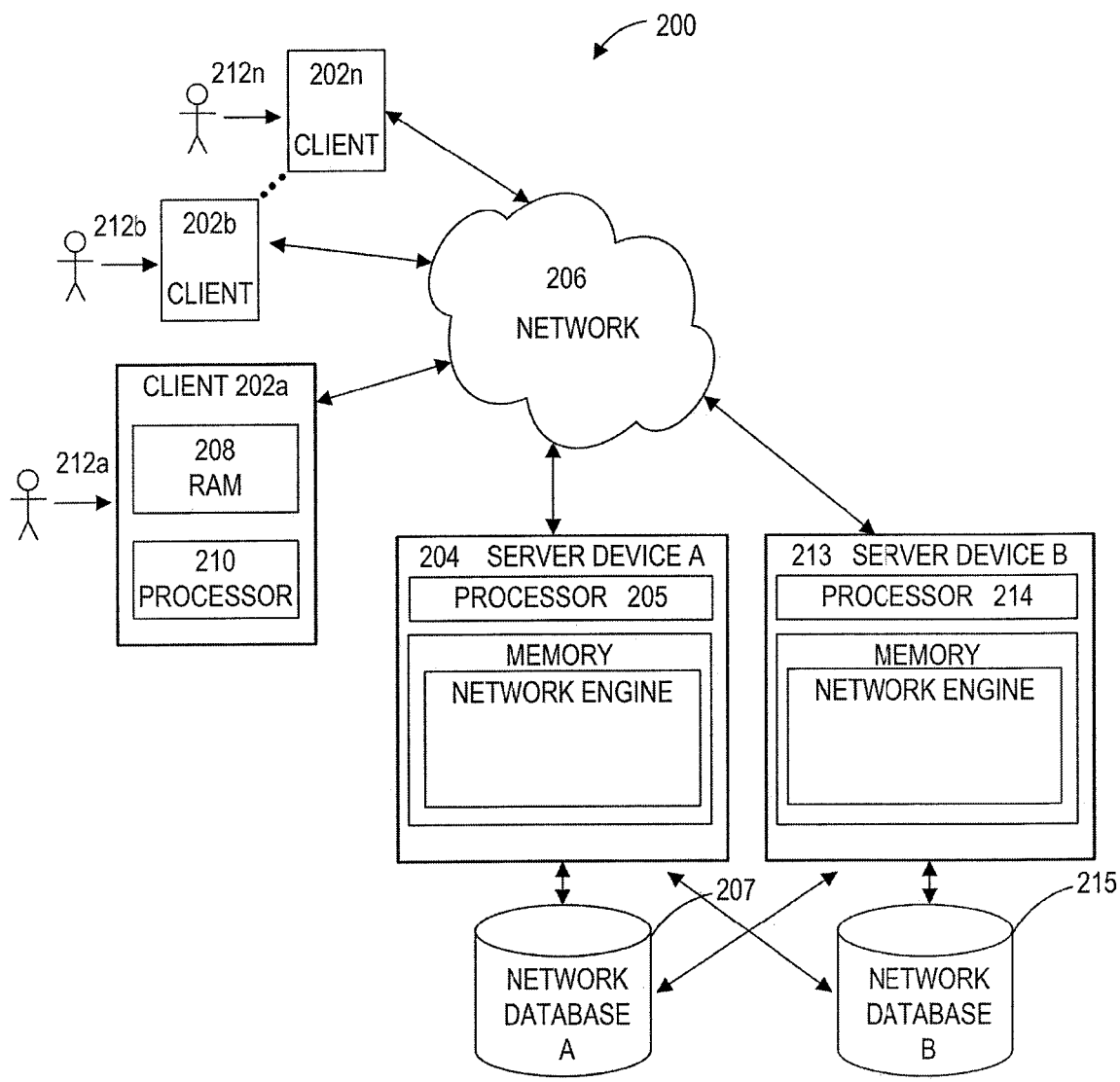

FIG. 2 shows another exemplary embodiment of the computer and network architecture that supports the computer transportation methods and computer transportation systems of the instant invention. In some embodiments, the member devices 202a, 202b thru 202n shown each at least includes a computer-readable medium, such as a random access memory (RAM) 208 coupled to a processor 210 or FLASH memory. In some embodiments, the processor 210 may execute computer-executable program instructions stored in memory 208. In some embodiments, such processors comprise a microprocessor, an ASIC, and state machines. In some embodiments, such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, and JavaScript.

In some embodiments, member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a may be any type of processor-based platform that is connected to a network 206 and that interacts with one or more application programs. Client devices 202a-n may operate on any operating system capable of supporting a browser or browser-enabled application, such as Microsoft™, Windows™, or Linux. The client devices 202a-n shown may include, for example, personal computers executing a browser application program such as Microsoft Corporation's Internet Explorer™, Apple Computer, Inc.'s Safari™, Mozilla Firefox, and Opera. Through the client devices 202a-n, users, 212a-n communicate over the network 206 with each other and with other systems and devices coupled to the network 206. As shown in FIG. 2, server devices 204 and 213 may be also coupled to the network 206. In an embodiment of the present invention, one or more clients can be a mobile client.

In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry®, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, near-field wireless communication (NFC) can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less.

In some embodiments, NFC may operate at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable devices within close proximity of each other.

Figure 3:
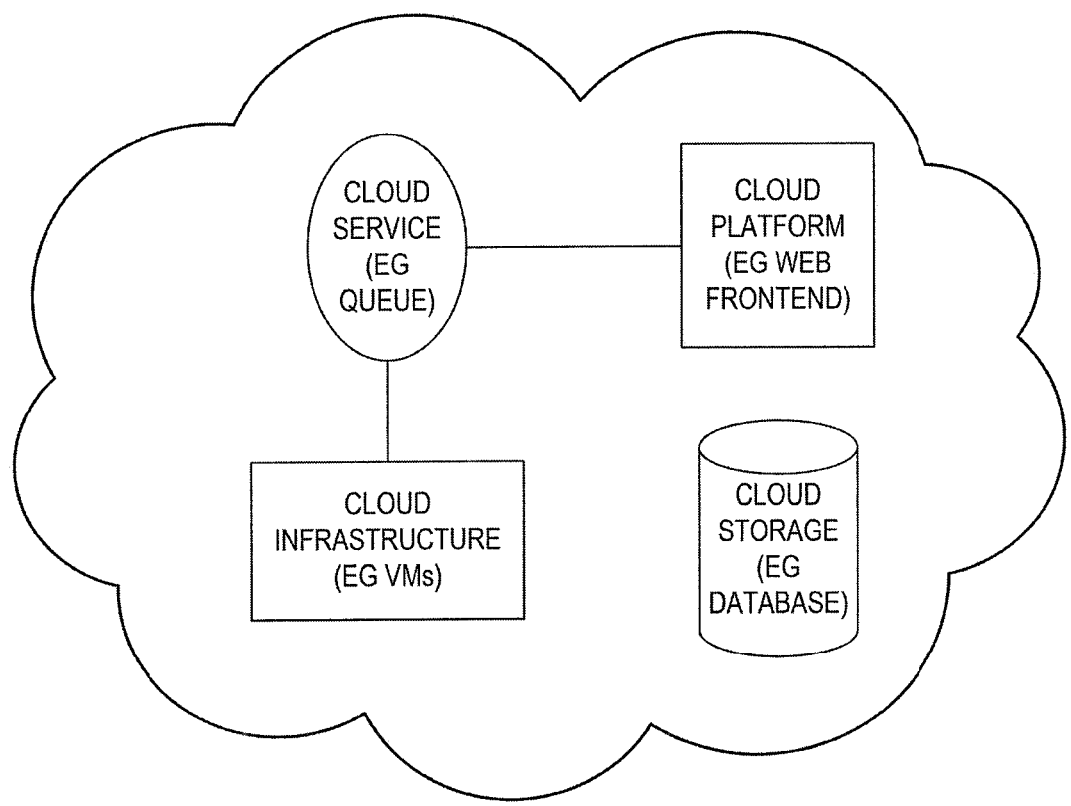
Figure 4:
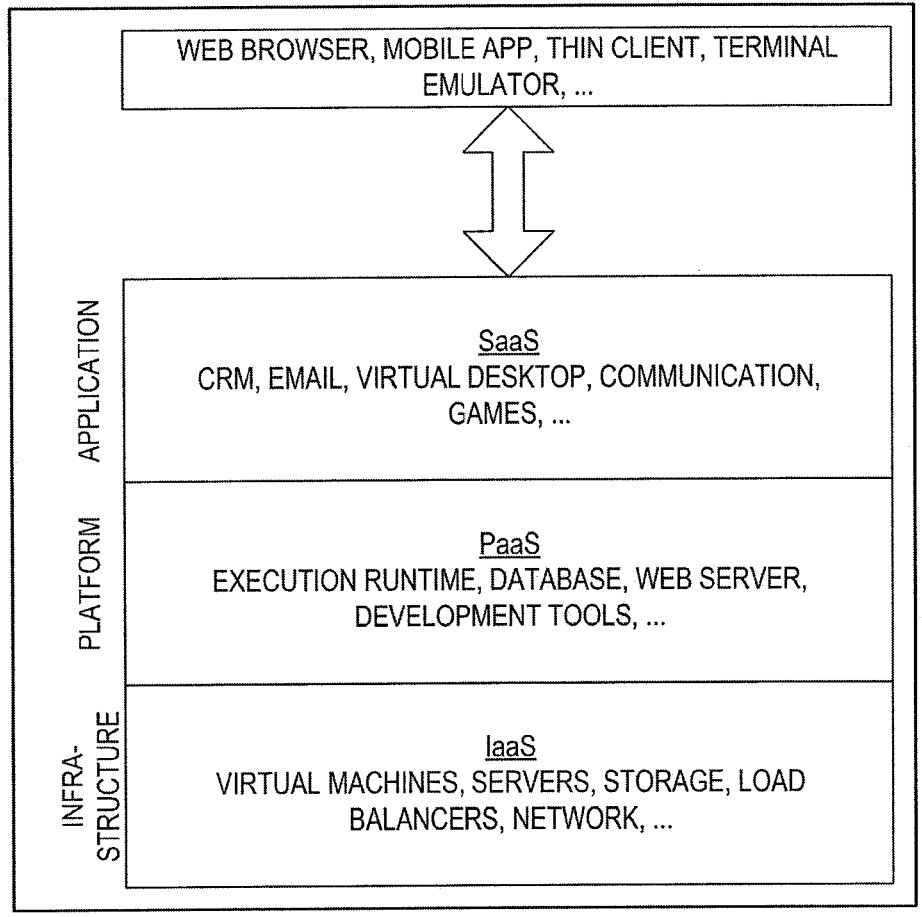

For purposes of the instant description, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the inventive computer transportation system offers/manages the cloud computing/architecture as, but not limiting to: infrastructure a service (IaaS), platform as a service (PaaS), and software as a service (SaaS). FIGS. 3 and 4 illustrate schematics of exemplary implementations of the cloud computing/architecture.

Of note, the embodiments described herein may, of course, be implemented using any appropriate computer transportation system hardware and/or computer transportation system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

In some embodiments, the present invention provides for a computer-implemented method that includes at least the following steps: electronically receiving, in real-time, by at least one specifically programmed computer processor, via at least one computer network, a plurality of electronic riding requests from a plurality of electronic computing devices operated by a plurality of ride-sharing requesting passengers; where each electronic riding request from each ride-sharing requesting passenger includes: an origin location data identifying a passenger-requested origin point, and a destination location data identifying a passenger-requested destination point; for a particular electronic riding request of a particular ride-sharing requesting passenger: electronically accessing, in real-time, by the at least one specifically programmed computer processor, for at least one database, at least one grid of virtual bus stops for at least one geographic locale; where each virtual bus stop corresponds to a geographic location point within the at least one geographic locale at which a particular ride-sharing requesting passenger can be picked up or drop off by a first assigned vehicle; dynamically selecting, in real-time, by the at least one specifically programmed computer processor, from at least one grid of virtual bus stops for the at least one geographic locale, a subset of candidate virtual pickup bus stops and a subset of candidate virtual dropoff bus stops based, at least in part, on: i) a first absolute walking distance, being a distance from the passenger-requested origin point to at least one candidate virtual pickup bus stop of the subset of candidate virtual pickup bus stops, and ii) a second absolute walking distance, being a distance from at least one candidate virtual dropoff bus stop of the subset of candidate virtual dropoff bus stops to the passenger-requested destination point; electronically receiving, in real-time, during a first time period, by the at least one specifically programmed computer processor, via the at least one computer network, current vehicle location data for a plurality of ride-sharing vehicles traveling within the at least one geographic locale, where the current vehicle location data include global positioning system (GPS) data generated by at least one GPS component of at least one electronic computing device associated with each ride-sharing vehicle; electronically accessing, in real-time, by the at least one specifically programmed computer processor, current ride-sharing data which are representative of current routes and current virtual bus stops associated with a plurality of riding passengers who are currently riding in the plurality of ride-sharing vehicles; where the plurality of riding passengers includes at least one hundred riding passengers; dynamically determining, in real-time, by the at least one specifically programmed computer processor, a plurality of candidate vehicles which can pick up the particular ride-sharing requesting passenger, where the determining of the plurality of candidate vehicles is based, at least in part on: the subset of candidate virtual pickup bus stops, the subset of candidate virtual dropoff bus stops, the current ride-sharing data and the current vehicle location data; dynamically determining, in real-time, from the plurality of candidate vehicles, by the at least one specifically programmed computer processor, 1) a first assigned vehicle for picking up the particular ride-sharing requesting passenger and 2) a pair of assigned virtual pickup and dropoff bus stop tasks related to the particular ride-sharing requesting passenger, based, at least in part, on: i) maximizing a vehicle occupancy to be at least two ride-sharing passengers in the first assigned vehicle at least a portion of a ride of the particular ride-sharing requesting passenger, ii) minimizing at least one of: 1) a first duration of time which each ride-sharing passenger spends in each candidate ride-sharing vehicle; 2) a second duration of time which each ride-sharing passenger spends waiting for each candidate ride-sharing vehicle to arrive at a respective virtual bus stop; 3) a third duration of time which each ride-sharing passenger spends walking from the passenger-requested origin point to a respective candidate virtual pickup bus stop and from a respective candidate virtual dropoff bus stop to the passenger-requested destination point; 4) a fourth duration of time which each candidate ride-sharing vehicle is held up in a traffic until a respective final virtual dropoff bus stop associated with the last ride-sharing passenger during a particular time period; iii) an order in which a pair of candidate virtual pickup and dropoff bus stop tasks are inserted into a route schedule of existing pickup and dropoff virtual bus stop tasks associated with each candidate vehicle of the plurality of candidate vehicles; dynamically generating, in real-time, by the at least one specifically programmed computer processor, a route proposal for the first assigned vehicle, where the route proposal for the first assigned vehicle includes a first updated route schedule, formed by inserting the pair of assigned virtual pickup and dropoff bus stop tasks of the particular ride-sharing requesting passenger into an existing route schedule, including existing pickup and dropoff virtual bus stop tasks associated with the first assigned vehicle; causing to electronically display, in real-time, via the at least one computer network, by the at least one specifically programmed computer processor, the assigned virtual pickup bus stop on a screen of a first electronic computing device associated with the particular ride-sharing requesting passenger, and causing to electronically display, in real-time, via the at least one computer network, by the at least one specifically programmed computer processor, the first updated route schedule on a screen of a second electronic computing device associated with the first assigned vehicle.

In some embodiments, the selecting of each candidate virtual pickup bus stop into the subset of candidate virtual pickup bus stops is based, at least in part, on at least one of: i) a first walking distance, being a distance from the passenger-requested origin point to each candidate virtual pickup bus stop, ii) a second walking distance, being a distance from each candidate virtual dropoff bus stop to the passenger-requested destination point, iii) at least one first walking comfort condition associated with the first walking distance, the second walking distance, or both, iv) at least one first walking safety condition associated with a first walking route, being a route from the passenger-requested origin point to each candidate virtual pickup bus stop, v) at least one passenger well-being related factor, vi) at least one passenger personal preference related to at least one of: a walking distance, an expected time of arrival, a ride duration, a price, and any combination thereof, vii) at least one environment related factor, viii) a first cost assigned to each pair of a particular candidate virtual pickup bus stop and a particular candidate virtual dropoff bus stop, and ix) any combination thereof; and where the selecting of each candidate virtual dropoff bus stop into the subset of candidate virtual dropoff bus stops is based, at least in part, on at least one of: i) the first walking distance, the second walking distance, or both, ii) the sum of the first walking distance and the second walking distance, iii) the at least one walking comfort condition, iv) at least one second walking safety condition associated with a second walking route, being a route from each candidate virtual dropoff bus stop to the passenger-requested destination point, v) the at least one passenger well-being related factor, vi) the at least one passenger personal preference, vii) the at least one environment related factor, viii) the first cost assigned to each pair of the particular candidate virtual pickup bus stop and the particular candidate virtual dropoff bus stop, and ix) any combination thereof.

In some embodiments, the cost assigned to each pair of the particular candidate virtual pickup bus stop and the particular candidate virtual dropoff bus stop is based, at least in part on at least one cost related to at least one ride segment passing through an area associated with a particular demand.

In some embodiments, the first absolute walking distance is a first reasonable walking distance; where the second absolute walking distance is a second reasonable walking distance; and where the method further includes: dynamically determining, by the at least one specifically programmed computer processor, the first reasonable walking distance based, at least in part, on at least one of: i) the distance from the passenger-requested origin point to the at least one candidate virtual pickup bus stop, ii) a direction of travel of a road on which the at least one candidate virtual pickup bus stop is located, iii) an availability of at least one first additional candidate virtual pickup bus stop having a shorter walking distance, and iv) an availability of at least one second additional candidate virtual pickup bus stop having a longer walking distance; and dynamically determining, by the at least one specifically programmed computer processor, the second reasonable walking distance based, at least in part, on at least one of: i) the distance from at least one candidate virtual dropoff bus stop of the subset of candidate virtual dropoff bus stops to the passenger-requested destination point, ii) a direction of travel of a road on which the at least one candidate virtual dropoff stop is located, iii) an availability of at least one first additional candidate virtual dropoff bus stop having a shorter walking distance, and iv) an availability of at least one second additional candidate virtual dropoff bus stop having a longer walking distance.

In some embodiments, the dynamically generating the route proposal for the first assigned vehicle is based, at least in part, on one of: i) at least one existing pickup virtual bus stop task and at least one existing dropoff virtual bus stop task associated with the first assigned vehicle, ii) a road speed of at least one road on which the first assigned vehicle travels or will travel, iii) a distance of at least one route which the first assigned vehicle will travel, and iv) a particular demand associated with the at least one route which the first assigned vehicle will travel.

In some embodiments, the method can further include steps(s) of: continuously tracking, in real-time, by the at least one specifically programmed computer processor, the current vehicle location and the current ride-sharing data to identify at least one condition which requires to re-assign the pair of assigned virtual pickup and dropoff bus stop tasks related to the particular ride-sharing requesting passenger to a second assigned vehicle; dynamically reassigning, by the at least one specifically programmed computer processor, the assigned virtual pickup bus stop task from the first assigned vehicle to the second assigned vehicle; dynamically revising, by the at least one specifically programmed computer processor, the first updated route schedule of the first assigned vehicle to obtain a first revised updated route schedule, by removing the pair of assigned virtual pickup and dropoff bus stop tasks related to the particular ride-sharing requesting passenger; dynamically revising, by the at least one specifically programmed computer processor, a second updated route schedule of the second assigned vehicle to add a second pair of assigned virtual pickup and dropoff bus stop tasks related to the particular ride-sharing requesting passenger, causing to electronically display, in real-time, via the at least one computer network, by the at least one specifically programmed computer processor, the first revised updated route schedule on the screen of the electronic computing device associated with the first assigned vehicle; and causing to electronically display, in real-time, via the at least one computer network, by the at least one specifically programmed computer processor, the second updated route schedule on a screen of an electronic computing device associated with the second assigned vehicle.

In some embodiments, the method can further include step(s) of: generating, by the at least one specifically programmed computer processor, the at least one grid of virtual bus stops for at least one geographic locale; where each virtual bus stop corresponds to a geographic location point within the at least one geographic locale at which at least one passenger can be picked up or drop off by at least one vehicle; electronically receiving, by the at least one specifically programmed computer processor, via the at least one computer network, human-readable location identifying data for uniquely identify each geographic location point corresponding to each virtual bus stop in the grid of virtual bus stops; electronically associating, by the at least one specifically programmed computer processor, the human-readable location identifying data to each geographic location point corresponding to each virtual bus stop in the grid of virtual bus stops; and electronically storing, by the at least one specifically programmed computer processor, the grid of virtual bus stops with the human-readable location identifying data in the at least one database.

In some embodiments, the geographic location point is along at least one main road of the at least one geographic locale.

In some embodiments, the method can further include steps(s) of: generating, by the at least one specifically programmed computer processor, demand-point tasks based, at least in part, on one of: current ride-sharing demand data within the at least one geographic locale, and historic ride-sharing demand data within the at least one geographic locale; dynamically assigning, by the at least one specifically programmed computer processor, at least one demand-point task assigned to the first assigned vehicle; and where the dynamically determining the first assigned vehicle and the pair of assigned virtual pickup and dropoff bus stop tasks related to the particular ride-sharing requesting passenger is further based, at least in part, on the at least one demand-point task.

In some embodiments, the current demand data includes data regarding at least one of: i) a first current ride-sharing demand in a vicinity of the passenger-requested origin point, and ii) a second current ride-sharing demand in a vicinity of the passenger-requested destination point.

In some embodiments, each respective reasonable walking distance is in the range of 100-300 meters.

In some embodiments, the dynamically determining the first assigned vehicle and the pair of assigned virtual pickup and dropoff bus stop tasks related to the particular ride-sharing requesting passenger is further based, at least in part, on minimizing an additional walking distance, and where the additional walking distance is in the range of 0-200 meters.

In some embodiments, each respective absolute walking distance is in the range of 200-500 meters. In some embodiments, the dynamically determining the first assigned vehicle and the pair of assigned virtual pickup and dropoff bus stop tasks related to the particular ride-sharing requesting passenger is further based, at least in part, on avoiding exceeding at least one of: i) a fifth duration of time by which a ride duration of each ride-sharing passenger in each candidate ride-sharing vehicle is increased due to the addition of the ride-sharing requesting passenger in the existing route schedule of such candidate ride-sharing vehicle, ii) a detour distance by which a ride distance for each ride-sharing passenger in each candidate ride-sharing vehicle is increased due to the addition of the ride-sharing requesting passenger in the existing route schedule of such candidate ride-sharing vehicle. In some embodiments, the fifth duration of time is in the range of 0.5-15 minutes, and where the detour distance is in the range of 100-1000 meters.

In some embodiments, the present invention provides a computer-implemented transportation system which can include at least the following components: at least one specialized computer machine, including: a non-transient memory, electronically storing particular computer executable program code; and at least one computer processor which, when executing the particular program code, becomes at least one specifically programmed computer processor of the at least one specialized computer machine of the computer-implemented transportation system that is configured to perform at least the following operations: electronically receiving, in real-time, by at least one specifically programmed computer processor, via at least one computer network, a plurality of electronic riding requests from a plurality of electronic computing devices operated by a plurality of ride-sharing requesting passengers; where each electronic riding request from each ride-sharing requesting passenger includes: an origin location data identifying a passenger-requested origin point, and a destination location data identifying a passenger-requested destination point; for a particular electronic riding request of a particular ride-sharing requesting passenger: electronically accessing, in real-time, by the at least one specifically programmed computer processor, for at least one database, at least one grid of virtual bus stops for at least one geographic locale; where each virtual bus stop corresponds to a geographic location point within the at least one geographic locale at which a particular ride-sharing requesting passenger can be picked up or drop off by a first assigned vehicle; dynamically selecting, in real-time, by the at least one specifically programmed computer processor, from at least one grid of virtual bus stops for the at least one geographic locale, a subset of candidate virtual pickup bus stops and a subset of candidate virtual dropoff bus stops based, at least in part, on: i) a first absolute walking distance, being a distance from the passenger-requested origin point to at least one candidate virtual pickup bus stop of the subset of candidate virtual pickup bus stops, and ii) a second absolute walking distance, being a distance from at least one candidate virtual dropoff bus stop of the subset of candidate virtual dropoff bus stops to the passenger-requested destination point; electronically receiving, in real-time, during a first time period, by the at least one specifically programmed computer processor, via the at least one computer network, current vehicle location data for a plurality of ride-sharing vehicles traveling within the at least one geographic locale, where the current vehicle location data include global positioning system (GPS) data generated by at least one GPS component of at least one electronic computing device associated with each ride-sharing vehicle; electronically accessing, in real-time, by the at least one specifically programmed computer processor, current ride-sharing data which are representative of current routes and current virtual bus stops associated with a plurality of riding passengers who are currently riding in the plurality of ride-sharing vehicles; where the plurality of riding passengers includes at least one hundred riding passengers; dynamically determining, in real-time, by the at least one specifically programmed computer processor, a plurality of candidate vehicles which can pick up the particular ride-sharing requesting passenger, where the determining of the plurality of candidate vehicles is based, at least in part on: the subset of candidate virtual pickup bus stops, the subset of candidate virtual dropoff bus stops, the current ride-sharing data and the current vehicle location data; dynamically determining, in real-time, from the plurality of candidate vehicles, by the at least one specifically programmed computer processor, 1) a first assigned vehicle for picking up the particular ride-sharing requesting passenger and 2) a pair of assigned virtual pickup and dropoff bus stop tasks related to the particular ride-sharing requesting passenger, based, at least in part, on: i) maximizing a vehicle occupancy to be at least two ride-sharing passengers in the first assigned vehicle at least a portion of a ride of the particular ride-sharing requesting passenger, ii) minimizing at least one of: 1) a first duration of time which each ride-sharing passenger spends in each candidate ride-sharing vehicle; 2) a second duration of time which each ride-sharing passenger spends waiting for each candidate ride-sharing vehicle to arrive at a respective virtual bus stop; 3) a third duration of time which each ride-sharing passenger spends walking from the passenger-requested origin point to a respective candidate virtual pickup bus stop and from a respective candidate virtual dropoff bus stop to the passenger-requested destination point; 4) a fourth duration of time which each candidate ride-sharing vehicle is held up in a traffic until a respective final virtual dropoff bus stop associated with the last ride-sharing passenger during a particular time period; iii) an order in which a pair of candidate virtual pickup and dropoff bus stop tasks are inserted into a route schedule of existing pickup and dropoff virtual bus stop tasks associated with each candidate vehicle of the plurality of candidate vehicles; dynamically generating, in real-time, by the at least one specifically programmed computer processor, a route proposal for the first assigned vehicle, where the route proposal for the first assigned vehicle includes a first updated route schedule, formed by inserting the pair of assigned virtual pickup and dropoff bus stop tasks of the particular ride-sharing requesting passenger into an existing route schedule, including existing pickup and dropoff virtual bus stop tasks associated with the first assigned vehicle; causing to electronically display, in real-time, via the at least one computer network, by the at least one specifically programmed computer processor, the assigned virtual pickup bus stop on a screen of a first electronic computing device associated with the particular ride-sharing requesting passenger; and causing to electronically display, in real-time, via the at least one computer network, by the at least one specifically programmed computer processor, the first updated route schedule on a screen of a second electronic computing device associated with the first assigned vehicle.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A system for routing a ridesharing vehicle, the system comprising:
   memory for storing historic ridesharing demand data associated with a geographic locale;
   at least one processor configured to access the memory and to:
      receive ride requests of a plurality of users headed to differing destinations, wherein each ride request includes an origin point and a destination point;
      receive current vehicle location data for a plurality of ridesharing vehicles within the geographic locale, where the current vehicle location data includes global positioning system (GPS) data generated by at least one GPS component of at least one electronic computing device associated with each ridesharing vehicle;
      determine, based on the current vehicle location data and the received ride requests, a ridesharing vehicle to pick up at least one of the users;
      select virtual bus stops for the ridesharing vehicle, including a first virtual bus stop for picking up the at least one user and a second virtual bus stop for dropping off the at least one user;
      use the historic ridesharing demand data to identify at least one high demand area in the geographical locale;
      select a route from the first virtual bus stop to the second virtual bus stop, wherein the selected route passes through the at least one identified high demand area; and
      direct the ridesharing vehicle to travel along the selected route for picking up the at least one user at the first virtual bus stop and dropping off the at least one user at the second virtual bus stop.

2. A method for routing a ridesharing vehicle, the method comprising:
   accessing historic ridesharing demand data associated with a geographic locale;
   receiving ride requests of a plurality of users headed to differing destinations, wherein each ride request includes an origin point and a destination point;
   receive current vehicle location data for a plurality of ridesharing vehicles within a geographic locale, where the current vehicle location data includes global positioning system (GPS) data generated by at least one GPS component of at least one electronic computing device associated with each ridesharing vehicle;
   determining, based on the current vehicle location data and the received ride requests, a ridesharing vehicle to pick up at least one of the users s;
   selecting virtual bus stops for the ridesharing vehicle, including a first virtual bus stop for picking up the at least one user and a second virtual bus stop for dropping off the at least one user,
   using the historic ridesharing demand data to identify at least one high demand area in the geographical locale;
   selecting a route from the first virtual bus stop to the second virtual bus stop, wherein the selected route passes through the at least one identified high demand area; and
   directing the ridesharing vehicle to travel along the selected route for picking up the at least one user at the first virtual bus stop and dropping off the at least one user at the second virtual bus stop.

3. The system of claim 1, wherein the at least one processor is further configured to:
   receive an additional ride request of an additional user, wherein the additional ride request includes an origin point located at a walking distance from a high demand area; and
   transmit instructions to the additional user to travel to a virtual pick-up bus stop located in the high demand area.

4. The system of claim 1, wherein the at least one processor is further configured to:
   determine a vehicle occupancy of the ridesharing vehicle; and
   when the vehicle occupancy exceeds a pre-determined threshold of passengers, select a new route from the first virtual bus stop to the second virtual bus stop, wherein the new route does not pass through the at least one identified high demand area.

5. The system of claim 4, wherein the at least one processor is further configured to:
   identify a first route that passes through a central avenue and a second route that passes through a peripheral avenue;
   when the vehicle occupancy is below the pre-determined number of passengers, select the first route as the new route even if the second route is estimated to be faster.

6. The system of claim 4, wherein the pre-determined threshold is at least three empty seats available.

7. The system of claim 1, wherein the at least one processor is further configured to:
   use the historic ridesharing demand data to identify a plurality of high demand areas in the geographical locale; and
   prioritize the plurality of high demand areas according to currently expected demand.

8. The system of claim 7, wherein the at least one processor is further configured to allocate ridesharing vehicles between different high demand areas based on the currently expected demand in each of the plurality of high demand areas.

9. The system of claim 1, wherein the at least one processor is further configured to:
   prioritize vacant ridesharing vehicles according to a currently expected demand; and
   direct the vacant ridesharing vehicles to virtual terminals according to the prioritization.

10. The system of claim 1, wherein the first virtual bus stop includes a virtual pick-up bus stop located at a first location differing from an origin point of a corresponding user, and the second virtual bus stop includes a virtual drop-off bus stop at a second location differing from a destination point of the corresponding user.

11. The system of claim 10, wherein the at least one processor is further configured to readjust, during a ride of the ridesharing vehicle, the second location of the virtual drop-off bus stop when the ridesharing vehicle is being assigned to an additional user.

12. The system of claim 10, wherein the at least one processor is further configured to select the virtual pick-up bus stop such that the first location is less than a threshold distance from the origin point of the corresponding user and the second location is less than the threshold distance from the destination point of the corresponding user.

13. The system of claim 12, wherein the threshold distance is, at least partially, determined in real-time based on at least one of a weather condition, an overall system demand, and a delay duration associated with the ridesharing vehicle.

14. The system of claim 1, wherein the at least one processor is further configured to:
dynamically assign ridesharing vehicles to pick up users in a manner that minimizes at least one of the following quality of service factors:
i) a first duration of time which each user spends in the ridesharing vehicle;
ii) a second duration of time which each user spends waiting for the ridesharing vehicle to arrive at a respective virtual bus stop;
iii) a third duration of time which each user spends walking to a respective virtual pick-up bus stop; or
iv) a fourth duration of time which each user spends walking to a respective desired destination.

15. The system of claim 1, wherein the at least one processor is further configured to:
generate a first time-estimation for the ridesharing vehicle to arrive at the first virtual bus stop for picking up the at least one user,
continuously track location a current location of the ridesharing vehicle prior to arrival at the first virtual bus stop, to generate an updated time-estimation for the ridesharing vehicle to arrive at the first virtual bus stop for picking up the at least one user;
cancel the assignment of the ridesharing vehicle when the updated time-estimation differs from the first time-estimation by more than a predefined threshold; and
reassign another ridesharing vehicle to pick up the at least one user from the first virtual bus stop.

16. The method of claim 2, further comprising:
prioritizing vacant ridesharing vehicles according to a currently expected demand; and
directing the vacant ridesharing vehicles to virtual terminals according to the prioritization.

17. The method of claim 2, further comprising:
determining a vehicle occupancy of the ridesharing vehicle; and
when the vehicle occupancy exceeds a pre-determined threshold of passengers, selecting a new route from the first virtual bus stop to the second virtual bus stop, wherein the new route does not pass through the at least one identified high demand area.

18. The method of claim 2, further comprising:
using the historic ridesharing demand data to identify a plurality of high demand areas in the geographical locale; and
prioritizing the plurality of high demand areas according to currently expected demand.

19. The method of claim 18, further comprising:
allocating ridesharing vehicles between different high demand areas, based on the currently expected demand in each of the plurality of high demand areas.

* * * * *